US012738409B2

(12) United States Patent
Lee

(10) Patent No.: US 12,738,409 B2
(45) Date of Patent: Sep. 15, 2026

(54) COIL COMPONENT

(71) Applicant: SAMSUNG ELECTRO-MECHANICS CO., LTD., Suwon-si (KR)

(72) Inventor: Han Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1027 days.

(21) Appl. No.: 17/847,502

(22) Filed: Jun. 23, 2022

(65) Prior Publication Data

US 2022/0415560 A1 Dec. 29, 2022

(30) Foreign Application Priority Data

Jun. 24, 2021 (KR) ........................ 10-2021-0082541

(51) Int. Cl.
*H01F 27/28* (2006.01)
*H01F 27/02* (2006.01)
*H01F 27/24* (2006.01)
*H01F 27/29* (2006.01)

(52) U.S. Cl.
CPC ....... *H01F 27/2804* (2013.01); *H01F 27/022* (2013.01); *H01F 27/24* (2013.01); *H01F 27/29* (2013.01); *H01F 2027/2809* (2013.01)

(58) Field of Classification Search
CPC .... H01F 27/2804; H01F 27/022; H01F 27/24; H01F 27/29; H01F 2027/2809; H01F 2017/048; H01F 17/0013; H01F 17/04; H01F 27/292; H01F 5/04
See application file for complete search history.

(56) References Cited

U.S. PATENT DOCUMENTS 1,041,293 A * 10/1912 Keller ..................... H01F 41/04 242/899
2005/0104708 A1* 5/2005 Goto ..................... H01F 27/323 336/225
2005/0184848 A1* 8/2005 Yoshida ................ H01F 41/046 336/223
2006/0001520 A1* 1/2006 Kaji ...................... H01F 41/041 257/E21.022

(Continued)

FOREIGN PATENT DOCUMENTS

JP 08-124760 * 5/1996
JP H08-298227 A 11/1996

(Continued)

OTHER PUBLICATIONS

Korean Office Action dated Aug. 23, 2025 issued in Korean Patent Application No. 10-2021-0082541 (with English translation).

(Continued)

*Primary Examiner* — Mang Tin Bik Lian
(74) *Attorney, Agent, or Firm* — Morgan Lewis & Bockius LLP

(57) ABSTRACT

A coil component includes: a body; a coil unit including lead-out ends and coils, and embedded in the body; and a core penetrating through the coil unit in a first direction, wherein a cross-section of each of the coils perpendicular to a direction in which the coil is wound has a plurality of round portions disposed on a side facing the core.

25 Claims, 16 Drawing Sheets

II - II'

(56) References Cited

U.S. PATENT DOCUMENTS

| | | | | |
|---|---|---|---|---|
| 2008/0157912 | A1* | 7/2008 | Tung | H01F 17/04 336/200 |
| 2008/0296528 | A1* | 12/2008 | Sutoh | H01F 1/344 252/62.6 |
| 2010/0194513 | A1* | 8/2010 | Ozawa | H05K 1/165 336/200 |
| 2011/0187486 | A1 | 8/2011 | Sugiyama et al. | |
| 2013/0241684 | A1 | 9/2013 | Yang et al. | |
| 2016/0049234 | A1* | 2/2016 | Kawashima | H01F 27/2804 336/200 |
| 2016/0229738 | A1* | 8/2016 | Umemoto | C03C 3/089 |
| 2017/0004917 | A1 | 1/2017 | Yang et al. | |
| 2017/0178798 | A1* | 6/2017 | Yoon | H01F 17/0013 |
| 2018/0061550 | A1* | 3/2018 | Lee | H01F 17/0013 |
| 2018/0197675 | A1 | 7/2018 | Kido | |
| 2019/0013133 | A1* | 1/2019 | Sasaki | H01F 17/0013 |
| 2019/0088402 | A1* | 3/2019 | Kim | H01F 17/0013 |
| 2019/0115134 | A1 | 4/2019 | Park et al. | |
| 2019/0259522 | A1* | 8/2019 | Kim | H01F 27/24 |
| 2019/0304666 | A1* | 10/2019 | Arai | H05K 1/111 |
| 2020/0027650 | A1* | 1/2020 | Ryu | H01F 17/0013 |
| 2020/0219651 | A1 | 7/2020 | Kang et al. | |
| 2020/0286672 | A1 | 9/2020 | Yang et al. | |
| 2021/0043359 | A1 | 2/2021 | Jung et al. | |
| 2022/0310301 | A1* | 9/2022 | Oide | H01F 27/085 |

FOREIGN PATENT DOCUMENTS

| | | | |
|---|---|---|---|
| JP | 2001-217126 | A | 8/2001 |
| JP | 2013-098356 | A | 5/2013 |
| JP | 2016-100344 | A | 5/2016 |
| JP | 2018-010961 | A | 1/2018 |
| JP | 2018-064025 | A | 4/2018 |
| JP | 2018-113299 | A | 7/2018 |
| JP | 2020-113742 | A | 7/2020 |
| JP | 2022-068922 | A | 5/2022 |
| KR | 10-2011-0038715 | A | 4/2011 |
| KR | 10-2013-0104808 | A | 9/2013 |
| KR | 10-2017-0003199 | A | 1/2017 |
| KR | 10-2017-0032056 | A | 3/2017 |
| KR | 10-1994759 | A | 7/2019 |
| KR | 10-2020-0107135 | A | 9/2020 |
| KR | 10-2021-0017661 | A | 2/2021 |

OTHER PUBLICATIONS

Japanese Office Action dated Dec. 16, 2025 issued in Japanese Patent Application No. 2022-101819 (with English translation).

* cited by examiner

COIL COMPONENT

CROSS-REFERENCE TO RELATED APPLICATION(S)

This application claims the benefit of priority to Korean Patent Application No. 10-2021-0082541 filed on Jun. 24, 2021 in the Korean Intellectual Property Office, the disclosure of which is incorporated herein by reference in its entirety.

TECHNICAL FIELD

The present disclosure relates to a coil component.

BACKGROUND

In order to satisfy system functions while reducing a size of an electronic product and increasing an integration density of the electronic product, a high-specification chip product having a small size and high capacity is required. Currently commercialized high-frequency chip inductor products include multilayer, thin-film, and wire-wound high-frequency inductors. In the high-frequency inductor, a decrease in DC resistance (Rdc) causes a decrease in combined resistance at a high frequency. Thus, in order to improve a Q characteristic, patterns are designed to have a large cross-sectional area. The present disclosure proposes a structure capable of improving a capacity or a Q characteristic under the same design by controlling cross-sections of patterns.

SUMMARY

An aspect of the present disclosure may provide a coil component capable of minimizing a decrease in inductance (Ls) while reducing a DC resistance (Rdc).

According to an aspect of the present disclosure, a coil component may include: a body; a coil unit including lead-out ends and coils, and embedded in the body; and a core penetrating through the coil unit in a first direction, wherein a cross-section of each of the coils perpendicular to a direction in which the coil is wound has a plurality of round portions disposed on a side facing the core.

According to another aspect of the present disclosure, a coil component may include: a body; a coil unit including lead-out ends and coils, and embedded in the body; and a core penetrating through the coil unit in a first direction, wherein, when a direction perpendicular to the first direction is defined as a second direction, and a direction perpendicular to both the first and second directions is defined as a third direction, at least one of a cross-section of each of the coils in the first and second directions and a cross-section of each of the coils in the first and third directions has a plurality of round portions disposed on a side facing the core.

According to still another aspect of the present disclosure, a coil component may include: a body; a coil unit including lead-out ends and coils, and embedded in the body; and a core penetrating through the coil unit in a first direction, wherein, in a cross-section of each of the coils perpendicular to a direction in which the corresponding coil is wound, a first average width of an inner region, facing the core, of the corresponding coil is smaller than a second average width of an outer region, facing away from the core, of the corresponding coil, wherein each of the first and second widths is defined in the first direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
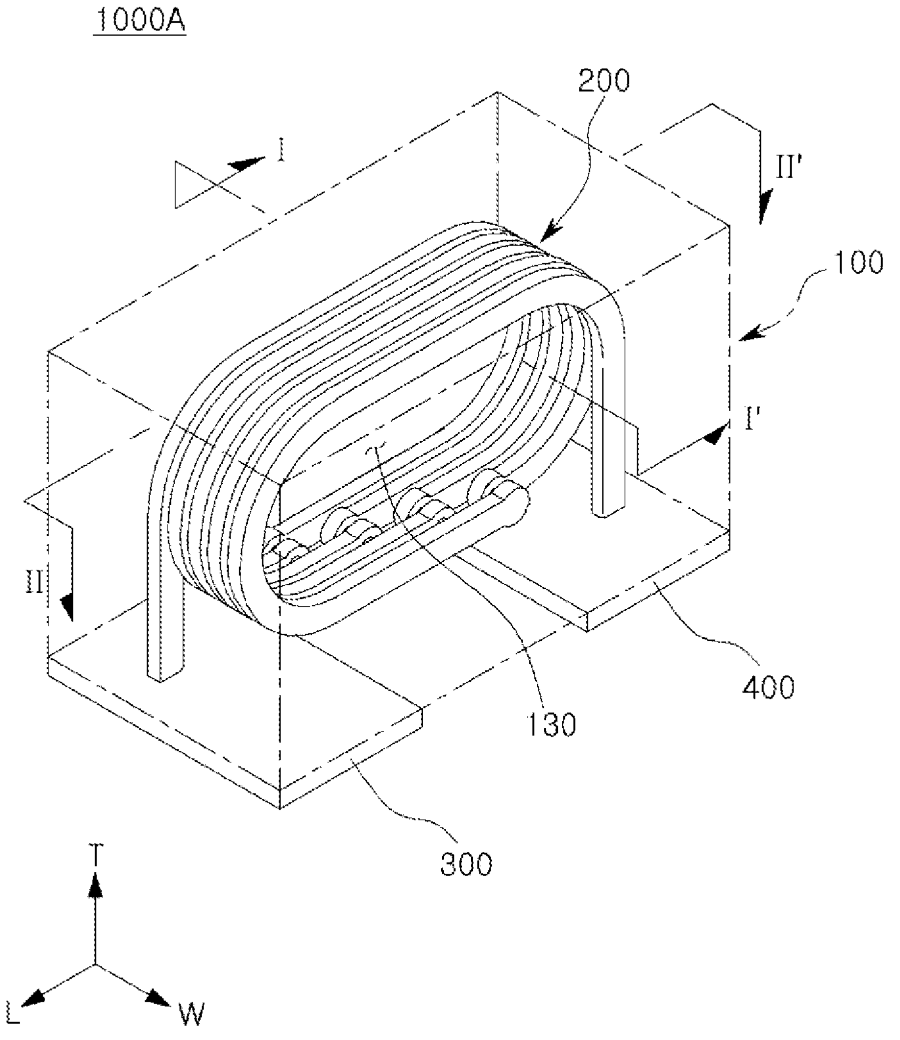
FIG. 1 is a schematic view illustrating a coil component according to an exemplary embodiment of the present disclosure.

Hereinafter, exemplary embodiments of the present disclosure will now be described in detail with reference to the accompanying drawings.

In the drawings, a W direction may be defined as a first direction or a width direction, an L direction may be defined as a second direction or a length direction, and a T direction may be defined as a third direction or a thickness direction.

Various kinds of electronic components may be used in electronic devices, and various kinds of coil components may be appropriately used between these electronic components to remove noise or for other purposes.

That is, in the electronic devices, the coil components used may be used as power inductors, high frequency (HF) inductors, general beads, high frequency (GHz) beads, common mode filters, and the like.

(Exemplary Embodiment)

Figure 2:
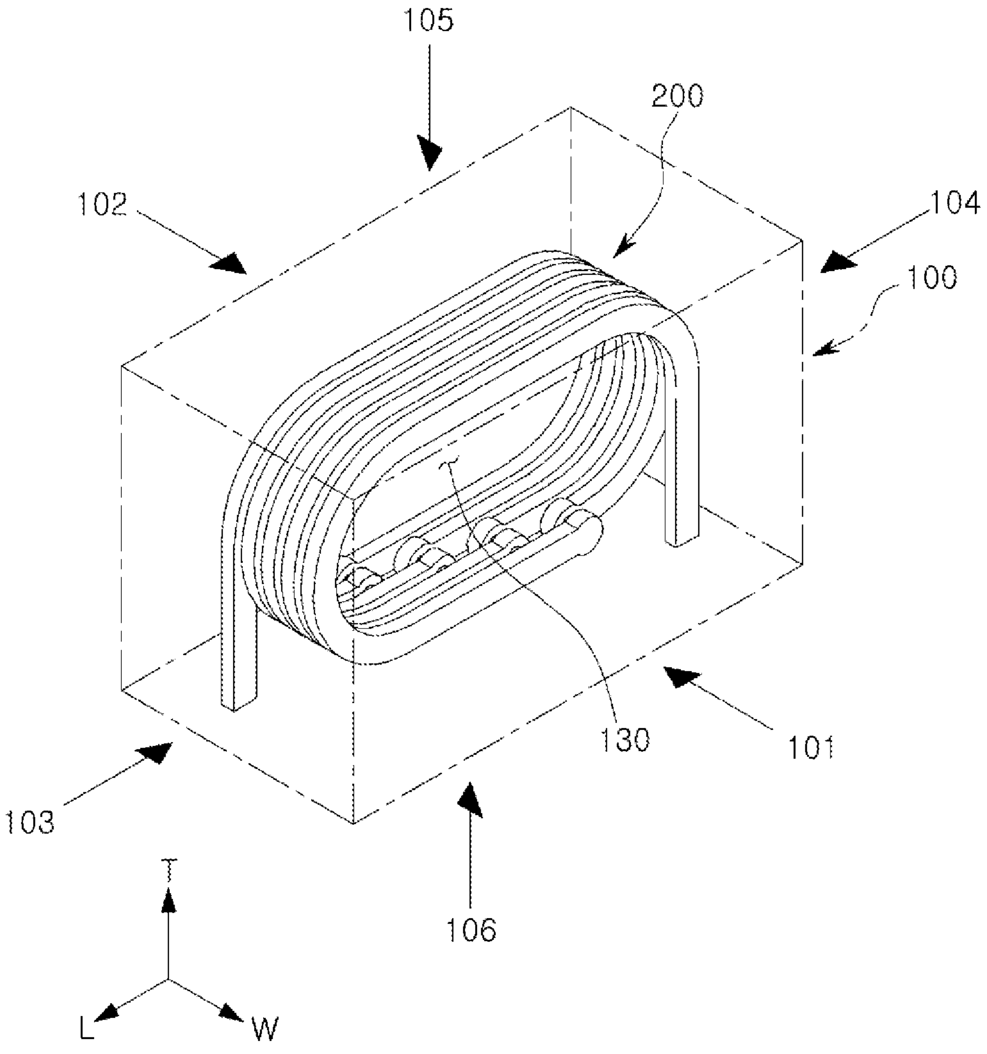
FIG. 2 is a schematic perspective view illustrating a body and a coil unit applied to an exemplary embodiment of the present disclosure.

FIG. 1 is a schematic view illustrating a coil component according to an exemplary embodiment of the present disclosure, and FIG. 2 is a schematic view illustrating a body and a coil unit applied to an exemplary embodiment of the present disclosure.

Figure 3:
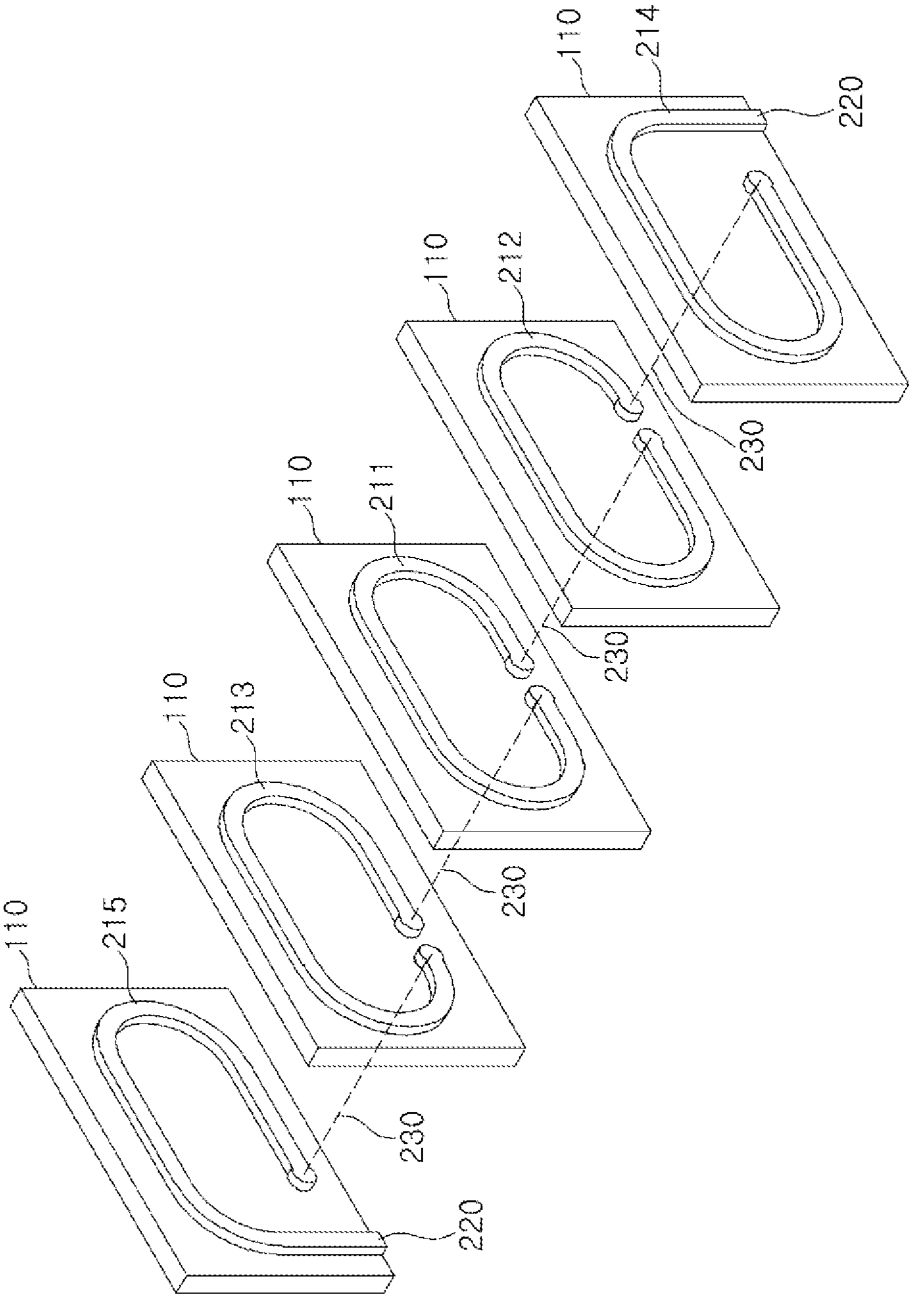
FIG. 3 is an exploded perspective view of FIG. 2.

FIG. 3 is an exploded perspective view of FIG. 2. Meanwhile, only effective layers 110 and a coil unit 200, which are main components, are illustrated in FIG. 3 for convenience of explanation.

Referring to FIGS. 1 through 3, the coil component 1000A according to an exemplary embodiment of the present disclosure may include a body 100, a coil unit 200, and external electrodes 300 and 400. The body 100 may include a plurality of effective layers 110 and a cover layer 120. In addition, the body 100 may include a core 130 penetrating through coils 210 of the coil unit 200, which will be described below, as a part of the body 100.

The body 100 may form an appearance of the coil component 1000A according to the present exemplary embodiment, and the coil unit 200 may be embedded in the body 100.

The body 100 may generally have a hexahedral shape.

Based on FIGS. 1 and 2, the body 100 may have a first surface 101 and a second surface 102 facing each other in the first direction W, a third surface 103 and a fourth surface 104 facing each other in the second direction L, and a fifth surface 105 and a sixth surface 106 facing each other in the third direction T. The first to fourth surfaces 101 to 104 of the body 100 may correspond to wall surfaces of the body 100 connecting the fifth surface 105 and the sixth surface 106 of the body 100 to each other. Hereinafter, both end surfaces of the body 100 may refer to the first surface 101 and the second surface 102 of the body 100, and both side surfaces of the body 100 may refer to the third surface 103 and the fourth surface 104 of the body 100.

The body 100 may be formed by stacking the cover layer 120 and the plurality of effective layers 110 in the third direction T, but is not limited thereto.

As an example, when the body 100 is formed by stacking the plurality of effective layers 110 in the third direction T, the body 100 may be formed by stacking a plurality of green sheets for forming the effective layers and a green sheet for forming the cover layer, and then sintering the stacked green sheets. In the above-described method, it may be difficult to distinguish a boundary between the effective layers 110 and a boundary between the effective layer 110 and the cover layer 120 after being sintered. The green sheets for forming the effective layers and the green sheet for forming the cover layer may be formed of the same ceramic slurry, but are not limited thereto.

Meanwhile, as a modification of the above-described example, the body 100 may be formed by stacking a plurality of magnetic composite sheets including a magnetic material and an insulating resin and curing the magnetic composite sheets. As another example, the body 100 may be formed by stacking a plurality of composite sheets including a dielectric powder and an insulating resin and curing the composite sheets. The plurality of magnetic composite sheets or composite sheets after being cured may become the effective layers 110 and the cover layer 120 of the present disclosure.

The magnetic material may be a ferrite or metal magnetic powder.

The ferrite powder may be, for example, one or more of spinel-type ferrite such as Mg—Zn-based ferrite, Mn—Zn-based ferrite, Mn—Mg-based Cu—Zn-based ferrite, ferrite, Mg—Mn—Sr-based ferrite, or Ni—Zn-based ferrite, hexagonal ferrite such as Ba—Zn-based ferrite, Ba—Mg-based ferrite, Ba—Ni-based ferrite, Ba—Co-based ferrite, or Ba—Ni—Co-based ferrite, garnet-type ferrite such as Y-based ferrite, and Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metal magnetic powder may be amorphous or crystalline. For example, the metal magnetic powder may be a Fe—Si—B—Cr-based amorphous alloy powder, but is not necessarily limited thereto.

The dielectric powder may include at least one of an organic filler and an inorganic filler.

The organic filler may include at least one of, for example, acrylonitrile-butadiene-styrene (ABS), cellulose acetate, nylon, polymethyl methacrylate (PMMA), polybenzimidazole, polycarbonate, polyether sulfone, polyetherether ketone (PEEK), polyetherimide (PEI), polyethylene, polylactic acid, polyoxymethylene, polyphenylene oxide, polyphenylene sulfide, polypropylene, polystyrene, polyvinyl chloride, ethylene vinyl acetate, polyvinyl alcohol, polyethylene oxide, epoxy, and polyimide.

The inorganic filler may include one or more selected from the group consisting of silica ($SiO_2$), alumina ($Al_2O_3$), silicon carbide (SiC), titanium oxide ($TiO_2$), barium sulfate ($BaSO_4$), aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$). Meanwhile, the inorganic filler of the present exemplary embodiment is not limited to the aforementioned examples, and the inorganic filler of the present exemplary embodiment may include any type of ceramic material as long as it has a value of specific permeability close to 1.

Each of the magnetic powder and the dielectric powder may have an average particle diameter of about 0.1 μm to 30 μm, but is not limited thereto.

The insulating resin may include epoxy, polyimide, liquid crystal polymer, and the like either alone or in combination, but is not limited to.

The coil unit 200 may be embedded in the body 100 to express the characteristics of the coil component. For example, in a case where the coil component 1000A according to the present exemplary embodiment is used as a power inductor, the coil unit 200 may serve to store an electric field as a magnetic field to maintain an output voltage, thereby stabilizing power of an electronic device.

The coil unit 200 may include a plurality of separate coils 210 (e.g., coils 211 through 215), lead-out ends 220, and vias 230, which are formed on the effective layers 110.

The coils 210, the lead-out ends 220, and the vias 230 may be formed in the body 100 in an embedded form by applying a metal paste e.g., at least one type of metal selected from Ni, Al, Fe, Cu, Ti, Cr, Au, Ag, Pd, and Pt or a metal compound thereof, on the green sheets for forming the effective layers through screen printing or the like, and then sintering the metal paste together the green sheets. As another example, each of the coils 210, the lead-out ends 220, and the via 230 may be formed on each of the effective layers 110 through electrolytic plating. In this case, each of the coils 210, the lead-out ends 220, and the via 230 may include a seed layer formed by electroless plating, sputtering, or the like, and an electrolytic plating layer formed on the seed layer.

The coils 210 formed on the respective effective layers 110 may be connected to each other through the vias 230 penetrating through the respective effective layers 110 in the third direction T, as a result forming one core in the form in which the core 130 is wound multiple times in the third direction T.

Each of the coils 210 may be formed on each of the effective layers 110 in a circular or oval shape with one side thereof being open. That is, each of the coils 210 may be formed on each of the effective layers 110 with the number of turns being less than 1. As a result, as illustrated in FIG. 3, when the coil unit 200 and the core 130 are projected in the first direction W of FIG. 1, the core 130 may have a circular or oval shape. Each of the coils 210 may be formed in an open circular shape or an open oval shape.

The lead-out ends 220 may extend from respective outer coils (e.g., coils 214 and 215 in FIG. 3) of the coils 210 disposed on the outermost layers in the first direction W to the sixth surface 106 of the body 100. The lead-out ends 220 may be exposed to the sixth surface 106 of the body 100 to be connected to the external electrodes 300 and 400, which will be described below, respectively.

In order to reduce DC resistance (Rdc) of the coil component, it is necessary to improve current flowability. The current flowability may be improved by changing a pattern shape of the coil or increasing a cross-sectional area (line width) of the coil. In addition, by reducing the DC resistance (Rdc), a series resistance (Rs) at a high frequency may be reduced, and accordingly, a Q characteristic may be improved.

As an example of changing the pattern shape of the coil, the coil may be formed to have round portions at both ends of an edge thereof to minimize the number of vertices at which there is a risk of current concentration.

In the present exemplary embodiment, by forming each of the coils 210 to be rounded at edge portions, it is possible to prevent a current from being concentrated at both ends of the edge of the coil. Hereinafter, a structure of the coil according to the present disclosure will be described in detail.

Figure 4:
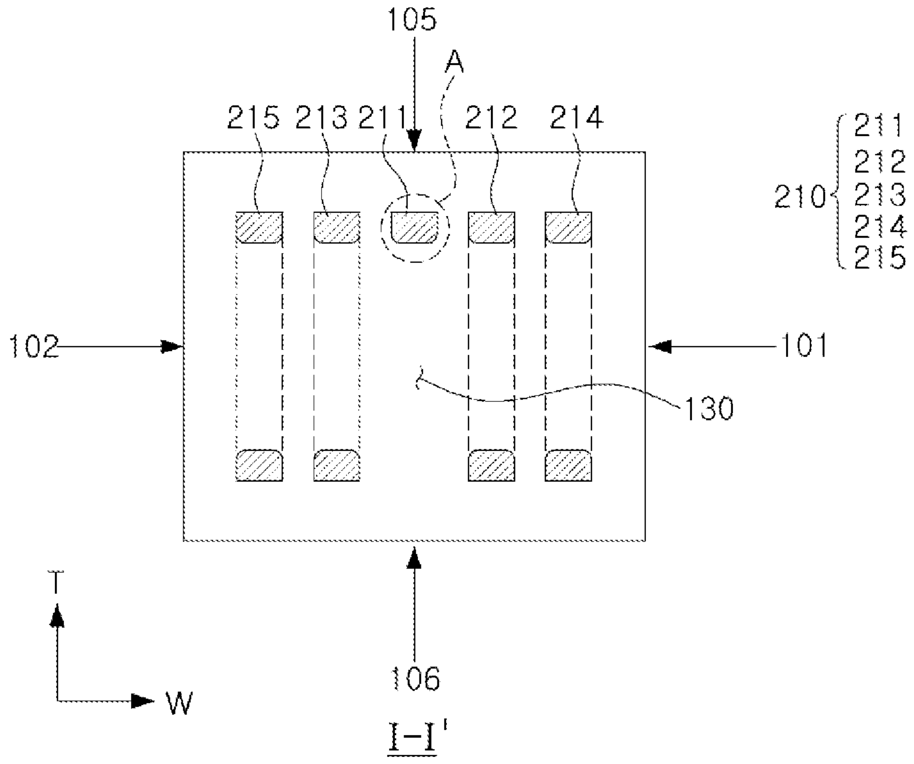
FIG. 4 is a cross-sectional view of the coil component of FIG. 1 taken along line I-I'.

FIG. 4 is a cross-sectional view of the coil component of FIG. 1 taken along line I-I'.

Figure 5:
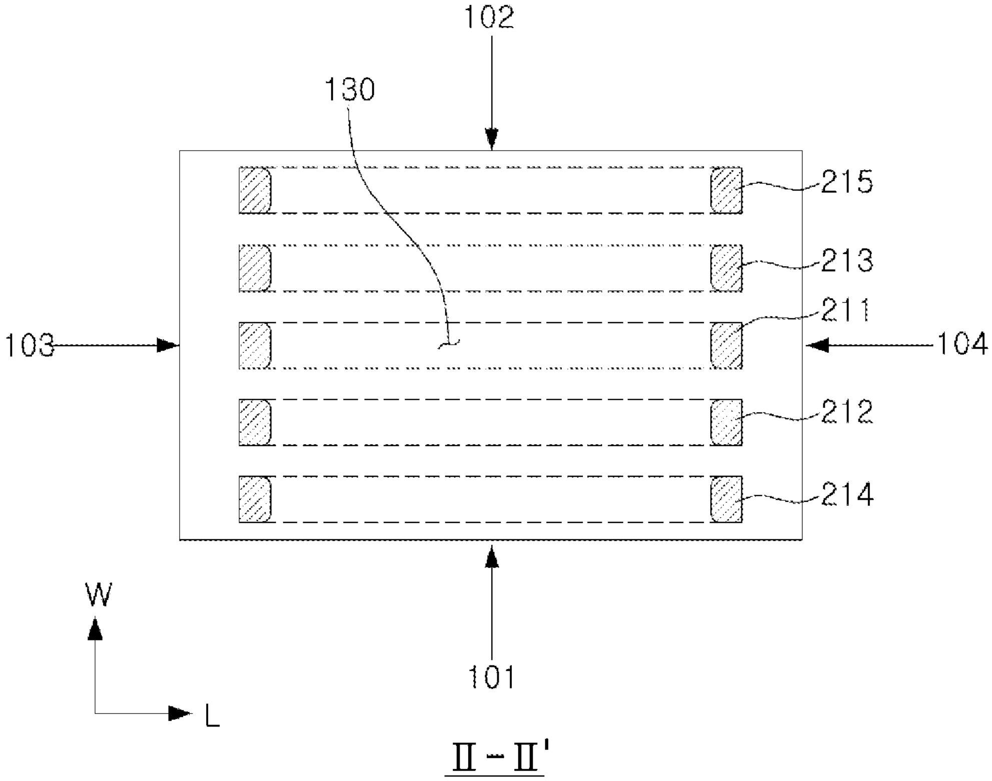
FIG. 5 is a cross-sectional view of the coil component of FIG. 1 taken along line II-II'.

FIG. 5 is a cross-sectional view of the coil component of FIG. 1 taken along line II-II'.

Only the body 100 and the coils 210, which are main components, are illustrated in FIGS. 4 and 5 for convenience of explanation.

Referring to FIGS. 4 and 5, in the coil component 1000A according to an exemplary embodiment, each of the coils 210 may have a plurality of round portions connected to both ends of at least some of edges thereof. That is, a cross-section of the coil perpendicular to a direction in which the coil is wound on the effective layer 110 may have a plurality of round portions R1 and R2 disposed on a side facing the core 130.

In other words, boundary lines of a cross-section of each of the coils 210 in the first and second directions W and L or a cross-section of each coil 210 in the first and third directions W and T may include a plurality of edges and a plurality of first and second round portions R1 and R2. The first and second round portions R1 and R2 may be connected to both ends of an edge facing the core 130 among the plurality of edges. Thus, the cross-section of the coil in the first and second directions W and L or the cross-section of the coil in the first and third directions W and T may have a shape surrounded by the plurality of edges and the plurality of first and second round portions R1 and R2.

In the present disclosure, an edge of a cross-section may refer to a straight boundary line among boundary lines surrounding a figure constituting the cross-section, and a round portion of a cross-section may refer to a curved boundary line among boundary lines surrounding a figure constituting the cross-section. Thus, the cross-section of each coil 210 may be completed by connecting the edges and the round portions to each other to form a closed loop shape.

In addition, in the present disclosure, a straight line may refer to not only a perfectly straight line but also a line including a slight curve that may be generated due to a process error or tolerance.

Since the plurality of round portions R1 and R2 are connected to both ends of the edge facing the core 130 of the cross-section of each coil 210, among side surfaces of the coil, a side surface facing the core 130 may have a curved surface.

The cross-section of each coil 210 perpendicular to the direction in which the coil is wound may have a shape surrounded by a plurality of edges 210-1, 210-2, 210-3, and 210-4, and first and second round portions R1 and R2. The plurality of edges may include first to fourth edges 210-1 to 210-4. Among the first to fourth edges 210-1 to 210-4, the first edge 210-1 is an edge facing the core 130. The round portions R1 and R2 formed through a separate rounding process may be connected to both ends of the first edge 210-1 facing the core 130. That is, the first edge 210-1 may be connected to the second and third edges 210-3 and 210-4 by the first and second round portions R1 and R2 formed through the rounding process, respectively. This will be described in more detail below with reference to FIG. 6. Here, the rounding process may be performed using a general conductor processing method including etching, polishing, and the like.

According to the above-described structure, in the cross-sectional views illustrated in FIGS. 4 and 5, each coil 210 may have a shape in which a cross-section of the coil disposed close to the fifth surface 105 of the body 100 with respect to the core 130 and a cross-section of the coil disposed close to the sixth surface 106 of the body 100 with respect to the core 130, which face each other, may be symmetrical to each other. Here, the term "symmetrical" may mean not only a perfectly identical shape with respect to a reference point but also a shape including a process error.

Since the plurality of round portions R1 and R2 are connected to both ends of the first edge 210-1 facing the core 130 as described above, it is possible to further increase a volume of the core 130. The increase in volume of the core 130 inside the coil 210 makes it possible to increase a value of inductance (L) that is proportional to the volume of the core 130, thereby improving the Q characteristic of the coil component 1000A.

Meanwhile, when a high-frequency signal is transmitted, an AC frequency increases, causing a skin effect and a parasitic effect. As a result, an AC resistance increases, and a current is concentrated in a specific region of the coil 210, causing non-uniformity in current density and deteriorating the Q characteristic accordingly.

The skin effect refers to a phenomenon in which in a case where an AC current is used, when a frequency increases, a current is concentrated on an outer periphery of a conductor. At this time, an effective area of the conductor through which the current flows decreases, and a transmission loss increases. Thus, the AC current density may decrease toward the center of the conduction wire, and the current may be concentrated on an outer side (skin) of the conductor of the electric wire.

The parasitic effect, which is a kind of skin effect, refers to a phenomenon in which when currents flow through two adjacent conductors in a high-frequency environment, if the currents flow in opposite directions, the currents are concentrated on adjacent sides of the two conductors, and if the currents flow in the same direction, the currents are concentrated on sides opposite to the adjacent sides of the two conductors. The concentration of the current on one side decreases an effective area of the conductor through which the current flows, and a transmission loss increases accordingly.

In the coil component 1000A having the above-described structure according to an exemplary embodiment illustrated in FIGS. 4 and 5, since the plurality of round portions R1 and R2 are connected to both ends of the first edge 210-1 facing the core 130 through the rounding process, it is possible to prevent a current from being concentrated in vertex regions as compared with that in a case where the cross-section of a coil has a rectangular shape. In this way, by performing a rounding process on some of vertices of a cross-section of each coil 210 perpendicular to a direction in which a current flows (the direction in which the coil 210 is wound), even though the current is concentrated on surfaces of the coil 210 due to the skin effect or the current is concentrated on one surface of the coil 210 farther away from an adjacent coil 210 than the other surface of the coil 210 due to the parasitic effect, it is possible to effectively prevent the current from more intensively flowing only toward edges of the coil 210.

Meanwhile, the shape of the cross-section of each coil 210 is not limited to what is illustrated in FIGS. 4 and 5. Even if the cross-section of the coil 210 has a polygonal shape instead of the rectangular shape when projected in the direction the coil 210 is wound, such a coil falls within the scope of the present disclosure. Even in this case, at least some of vertices of the polygonal cross-section of the coil 210 may be formed in a rounded form as described above.

Meanwhile, the lead-out ends 220 may also have the same cross-sectional shape as the coils 210. For example, a cross-section of the lead-out end 220 perpendicular to a direction in which the lead-out end 220 extends out of the body 100 from the same coil 210 may have a plurality of edges and a plurality of round portions, and the plurality of round portions may be spaced apart from each other and connected to both ends of at least one of the plurality of edges. The lead-out end 220 may be formed to have such a shape by processing the lead-out end 220 simultaneously with the coil 210. Concerning the shape of the cross-section of the lead-out end 220, what has been described above for the shape of cross-section of coil 210 is identically applicable, and accordingly, the shape of the cross-section of the lead-out end 220 may have the same effect in preventing concentration of current as the shape of cross-section of the coil 210.

Meanwhile, at least one of the cross-sections of the coils 210 and the lead-out ends 220 may have a shape in which the plurality of the round portions R1 and R2 are connected to each other. In this case, the plurality of the round portions R1 and R2 may be directly connected to each other, rather than being connected through an edge.

The first and second external electrodes 300 and 400 may be disposed on the sixth surface 106 of the body 100 and connected to the lead-out ends 220 of the coil unit 200, respectively. The sixth surface 106 may be a surface parallel to the first direction, in which the core 130 penetrates through the coil unit 200, among outer surfaces of the body 100.

The first and second external electrodes 300 and 400 may be formed in a single-layer structure or in a multilayer structure. As an example, each of the first and second external electrodes 300 and 400 may include a first layer including copper (Cu), a second layer disposed on the first layer and including nickel (Ni), and a third layer disposed on the second layer and including tin (Sn). The first and second external electrodes 300 and 400 may be formed by a plating method, a paste printing method, or the like. As a non-limiting example, each of the first and second external electrodes 300 and 400 may include a first layer formed by directly applying a conductive paste containing a conductive powder onto a body and curing the conductive paste or sintering the body on which the conductive paste is applied, and a second layer formed by electrolytic plating using the first layer as a base layer.

The first and second external electrodes 300 and 400 may be formed of a conductive material such as copper (Cu), aluminum (Al), silver (Ag), tin (Sn), gold (Au), nickel (Ni), lead (Pb), chromium (Cr), titanium (Ti), or an alloy thereof, but are not limited thereto.

Meanwhile, although it is illustrated in FIG. 1 as an example that the first external electrode 300 is formed only on the sixth surface 106 of the body 100 to have a lower surface electrode structure, the electrode structure is not limited thereto. As another example, the first external electrode 300 may be a five-surface electrode formed on the third surface 103 of the body 100 and extending to the first, second, fifth, and sixth surfaces 101, 102, 105, and 106 of the body 100. As another example, the first and second external electrodes 300 and 400 may be L-shaped electrodes formed on the third and fourth surfaces 103 and 104 of the body 100, respectively, and extending to the sixth surface 106 of the body 100. As another example, the first and second external electrodes 300 and 400 may be U-shaped electrodes formed on the third and fourth surfaces 103 and 104 of the body 100, respectively, and extending to the fifth and sixth surfaces 105 and 106 of the body 100.

Meanwhile, although not illustrated in the drawings, the coil component 1000A according to the present exemplary embodiment may further include an insulating layer formed on the first to sixth surfaces 101 to 106 of the body 100, except regions where the external electrodes 300 and 400 are disposed. The insulating layer may be used as a plating resist at the time of forming the external electrodes 300 and 400 by electrolytic plating, but is not limited thereto.

Figure 6:
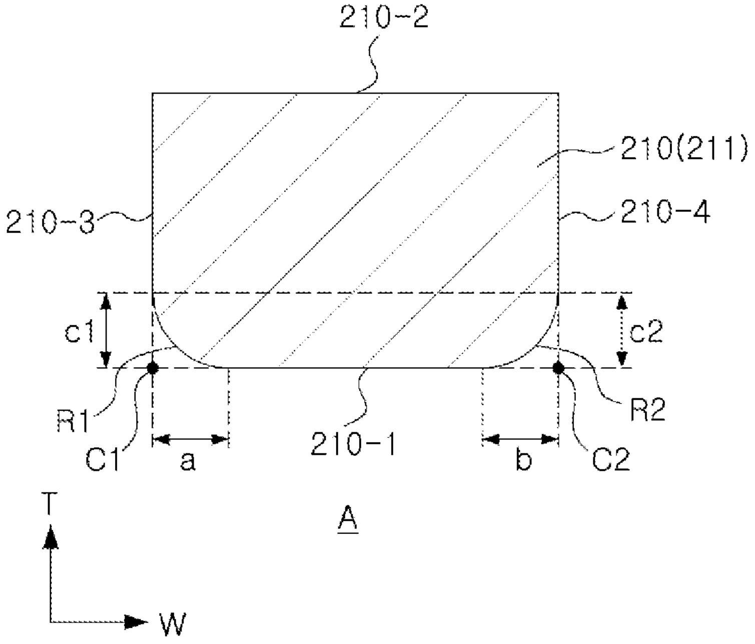
FIG. 6 is a partially enlarged view of region A of FIG. 4.

FIG. 6 is a partially enlarged view of region A of FIG. 4.

FIG. 6 illustrates an enlarged view of a cross-section of one of inner coils (e.g., coil 211) perpendicular to a direction in which the inner coil 211 is wound, among the coils 210.

However, a width in a cross-section of one of the coils 210 (211) to be described below with reference to FIG. 6 may be an average value of widths based on cross-sections of all coils 211, 212, 213, 214, and 215 exposed to a surface of the coil component 1000A cut along the center thereof in the second direction L, rather than a value of width based on only one inner coil 211.

Thus, for convenience of explanation, one of the coils 210 will be described below.

Referring to FIGS. 1 through 6, the cross-section of each coil 210 perpendicular to the direction in which the coil is wound may have a plurality of first to fourth edges 210-1 to 210-4 and a plurality of first and second round portions R1 and R2, and may have a structure in which the first and second round portions R1 and R2 are connected to both ends of the first edge 210-1 facing the core 130.

Referring to FIG. 6, the cross-section of one of the coils 210 (e.g., coil 211) perpendicular to the direction in which the coil is wound may include a first edge 210-1 facing the core 130, a second edge 210-2 facing the first edge 210-1, third and fourth edges 210-3 and 210-4 facing each other and connecting the first and second edges to each other, a first round portion R1 connecting the first and third edges 210-1 and 210-3 to each other, and a second round portion R2 connecting the first and fourth edges 210-1 and 210-4 to each other. Each of the third and fourth edges 210-3 and 210-4 may face another adjacent coil.

Since a side surface facing the core 130 among the side surfaces of the coil 210 (211) has a curved surface, in the coil component 1000A according to an exemplary embodiment of FIG. 1, the cross-section of the coil 210 perpendicular to the direction in which the coil is wound as illustrated in FIG. 6 may include a first round portion R1 and a second round portion R2 at any position of the coil 210. The first and second round portions R1 and R2 may be included in the curved surface of the coil 210.

Therefore, the cross-section of the coil 210 (211) illustrated in FIG. 6 may be surrounded by the first to fourth edges 210-1 to 210-4 and the first and second round portions R1 and R2.

Meanwhile, the first and second round portions R1 and R2 may be formed by performing a rounding process on the coil 210 (211) through etching or the like. For a multilayer inductor, the rounding process may be performed in a state in which the coil 210 is disposed on the effective layer 110.

As an example, the first round portion R1 may be formed at a position where an undercut generally occurs in a coil by performing a rounding process on one of both ends of the first edge 210-1 of the coil 210 (211) facing one surface of the effective layer 110, and the second round portion R2 may be formed by performing a rounding process on the other end opposite to one end of the first edge 210-1. Since the first and second round portions R1 and R2 face the core 130 in the coil component 1000A, it is possible to increase a volume of the core 130 as much as a volume of the coil 210 removed in the rounding process, thereby increasing a magnetic flux and an inductance.

Meanwhile, a width of the first round portion R1 in the first direction W is defined as a, a width of the second round portion R2 in the first direction W is defined as b, a width of each of the first and second round portions R1 and R2 in the third direction T perpendicular to the first direction W is defined as c, a Q characteristic of the coil 210 may vary depending on a ratio between a, b, and c for the first and second round portions R1 and R2.

Specifically, the width a of the first round portion R1 in the first direction W may refer to a shortest distance from a first intersection point C1 to the first edge 210-1, the first intersection point C1 being a point of intersection between a line extending from the first edge 210-1 in the first direction W and a line extending from the third edge 210-3 in the third direction T.

Also, the width b of the second round portion R2 in the first direction W may refer to a shortest distance from a second intersection point C2 to the first edge 210-1, the second intersection point C2 being a point of intersection between the line extending from the first edge 210-1 in the first direction W and a line extending from the fourth edge 210-4 in the third direction T.

In addition, the widths c1 and c2 of the first and second round portions R1 and R2 in the third direction T perpendicular to the first direction W may refer to shortest distances from the first and second intersection points C1 and C2 to the third and fourth edges 210-3 and 210-4, respectively.

Here, c1 and c2 may be substantially equal. In the present disclosure, the term "substantially equal" may mean not only a perfectly equal mathematical value but also a value including an error occurring in a typical manufacturing process.

The widths a, b, c1, and c2 described above may refer to values obtained by measuring a, b, c1, and c2 values for all of the coils 210 and calculating respective averages of the a, b, c1, and c2 values, rather than a, b, c1, and c2 values based on only one of the coils 211, 212, 213, 214, 215, 216, and 217.

Table 1 below shows a Q characteristic in a 2 GHZ frequency domain depending on an a/b value, and Table 2 below shows a Q characteristic in a 2 GHz frequency domain depending on an a/c1 or a/c2 value.

TABLE 1

| a/b | Q (2 GHz) |
|---|---|
| 0.6 | 38.1 |
| 0.7 | 39.5 |
| 0.8 | 40.9 |
| 0.9 | 41.0 |
| 1 | 41.2 |
| 1.1 | 41.1 |
| 1.2 | 40.8 |
| 1.3 | 39.4 |
| 1.4 | 38.2 |

TABLE 2

| a(b)/c1(c2) | Q (2 GHz) |
|---|---|
| 0.6 | 37.6 |
| 0.7 | 39.1 |
| 0.8 | 40.6 |
| 0.9 | 40.8 |
| 1 | 41.2 |
| 1.1 | 41.1 |
| 1.2 | 40.9 |
| 1.3 | 39.3 |
| 1.4 | 37.7 |

Referring to Table 1 above, it can be seen that when a is more than 0.8 times b and less than 1.2 times b, a preferable high Q characteristic of 40 or more may be achieved.

In addition, referring to Table 2 above, it can be seen that when a is more than 0.8 times c1 and less than 1.2 times c1, a preferable high Q characteristic of 40 or more may be achieved. That is, when a ratio of a to c1 (a/c1) satisfies $0.8<a/c1<1.2$, a preferable high Q characteristic may be achieved, but the ratio of a to c1 is not limited thereto.

Similarly, referring to Table 2 above, it can be seen that when b is more than 0.8 times c2 and less than 1.2 times c2, a preferable high Q characteristic of 40 or more may be achieved. That is, when a ratio of b to c2 (b/c2) satisfies $0.8<b/c2<1.2$, a preferable high Q characteristic may be achieved, but the ratio of b to c2 is not limited thereto.

Therefore, a may be more than 0.8 times b and less than 1.2 times b, and may be more than 0.8 times c1 and less than 1.2 times c1.

Meanwhile, since the widths a, b, c1, and c2 refer to values obtained by measuring a, b, c1, and c2 values for all of the coils 210 and calculating respective averages of the a, b, c1, and c2 values, rather than a, b, c1, and c2 values based on only one of the coils 211, 212, 213, 214, 215, 216, and 217, as described above, there may be a coil having a cross-section that does not satisfy above-described numerical ranges among the coils 211, 212, 213, 214, 215, 216, and 217, but the average a, b, c1, and c2 values may satisfy the above-described numerical ranges.

Meanwhile, although it is illustrated in FIG. 6 that c1 and c2 refer to widths of the first and second round portions R1 and R2 in the third direction T, all of a surface of the coil 210 (211) facing the core 130 is rounded regardless of whether the surface of the coil 210 faces the core 130 in the second direction L or in the third direction T. Therefore, even if it is assumed that c1 and c2 in FIG. 6 refer to widths of the first and second round portions R1 and R2 in the second direction L, the above-described numerical ranges is identically applicable thereto.

Meanwhile, the width of each coil 210 may be measured through digital photogrammetric analysis (DPA) or the like using equipment that is commonly used to measure physical properties of electronic components, after the coil component 1000A is dipped in an epoxy bath and cured through a curing process, and then a solid obtained through the curing process is polished to expose an inner cross-section of the coil component 1000A. Alternatively, the width of the coil 210 may be measured by fracturing the coil component 1000A, and the measurement method is not limited to what is described above. In this case, the cross-section exposed through the polishing process may be a cross-section of the coil component 1000A cut in the first and second directions W and L or in the first and third direction W and T as illustrated in the drawings. However, other measurement methods and/or tools appreciated by one of ordinary skill in the art, even if not described in the present disclosure, may also be used.

The widths a, b, c1, and c2 of the coil component 1000A measured by the above-described measurement method may be average a, b, c1, and c2 values based on cross-sections of all coils 211, 212, 213, 214, 215, 216, and 217 exposed to a surface of the coil component 1000A cut along the center thereof in the second direction L, rather than a, b, c1, and c2 values based on only one of the coils.

Referring to FIG. 6, in a cross-section of a coil 210 (211) perpendicular to a direction in which the coil 210 is wound, a first average width of an inner region, facing the core 130, of the coil 210 may be smaller than a second average width of an outer region, facing away from the core 130, of the coil 210, where each of the first and second widths is defined in the first direction W. Here, an average width can be obtained by measuring width values at multiple points (e.g., 3 to 5, but the number of measuring points is not limited thereto) selected within a region ranged from the innermost side or the outermost side of the cross-section with respect to the core 130 to a predetermined length, and averaging the obtained width values. However, other measurement methods and/or tools appreciated by one of ordinary skill in the art, even if not described in the present disclosure, may also be used.

(Modified Examples of Exemplary Embodiment)

Figure 7:
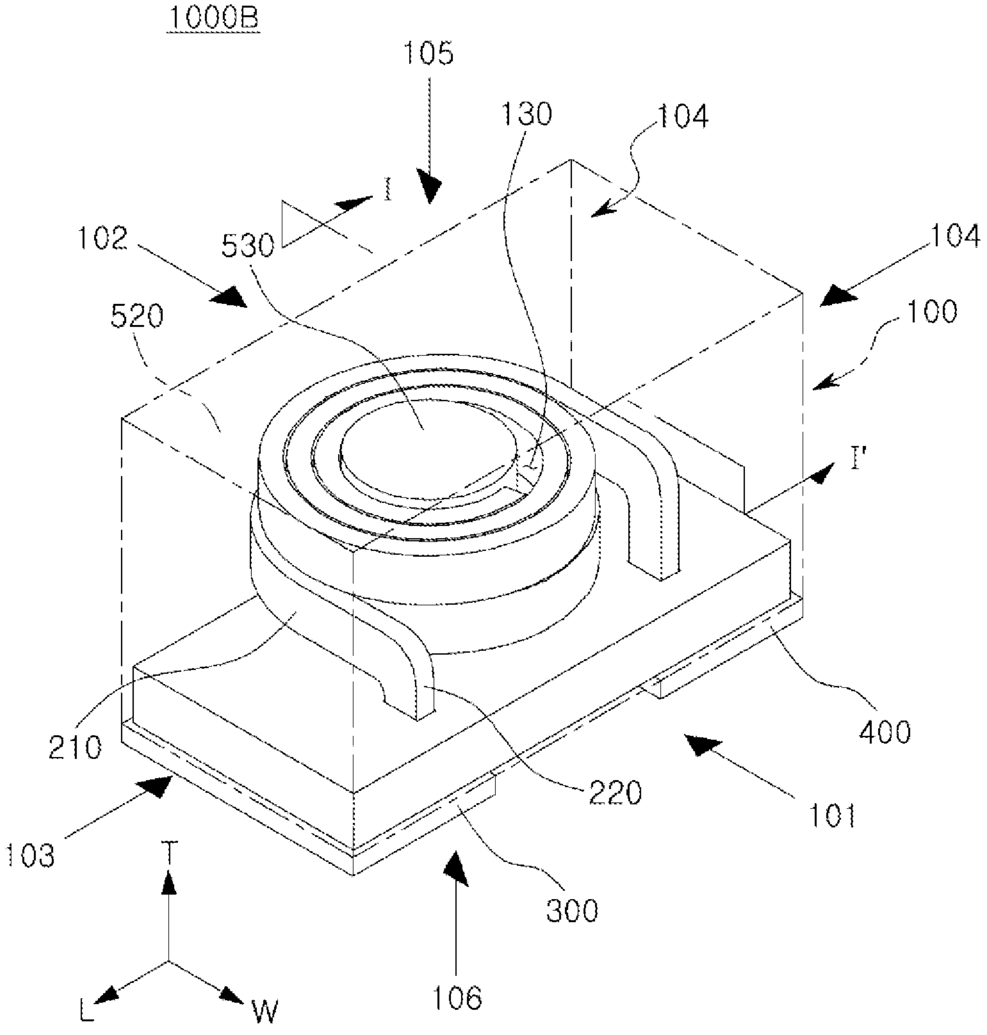
FIG. 7 is a schematic perspective view illustrating a modified example of the coil component of FIG. 1.

FIG. 7 is a schematic perspective view illustrating a modified example of the coil component of FIG. 1.

Figure 8:
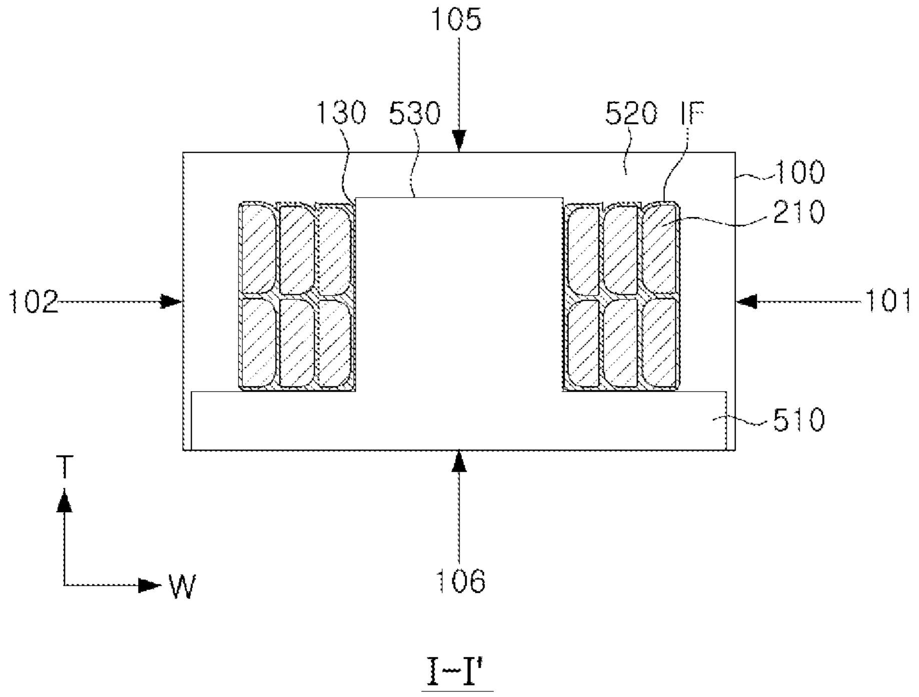
FIG. 8 is a cross-sectional view of the coil component of FIG. 7 taken along line I-I'.

FIG. 8 is a cross-sectional view of the coil component of FIG. 7 taken along line I-I'.

The coil component 1000B according to a modified example of FIG. 7 is different from the coil component 1000A according to an exemplary embodiment of FIG. 1 in the structure of the coil unit 200 in the body 100. Thus, what has been described above for the coil component 1000A according to an exemplary embodiment is identically applicable to the coil component 1000B according to a modified example, except the structure of the coil unit 200.

A body 100 of the coil component 1000B according to a modified example may include a mold portion 510 and a cover portion 520 disposed on one surface of the mold portion 510, and may further include a core portion 530 disposed to protrude from one surface of the mold portion 510. In this case, a coil unit 200 may be disposed on one surface of the mold portion 510, and the core portion 530 may be disposed in a core 130, such that coils 210, each having at least one turn, surround the core portion 530.

The body 100 may include a magnetic material. That is, at least one of the mold portion 510, the cover portion 520, and the core portion 530 may include a magnetic material. For example, the mold portion 510 may be formed by filling a mold with the magnetic material. As another example, the mold portion 510 may be formed by filling a mold with a composite material including a magnetic material and an insulating resin. A process of applying a high temperature and a high pressure to the magnetic material or the composite material in the mold may be additionally performed, but the formation of the mold portion 510 is not limited thereto. The mold portion 510 and the core portion 530 may be integrally formed by the aforementioned mold, and thus, no boundary may be formed therebetween. The cover portion 520 may be formed by disposing a magnetic composite sheet in which a magnetic material is dispersed in an insulating resin on the mold portion 510 and the coil unit 200, and then heating and pressing the magnetic composite sheet.

In the coil component 1000B according to a modified example, lead-out ends 220 may penetrate through the mold portion 510 to be connected to external electrodes 300 and 400.

Concerning the magnetic material in the body 100, what has been described above for the magnetic material in the coil component 1000A according to an exemplary embodiment of FIG. 1 is identically applicable.

Referring to FIG. 8, surfaces of the coils 210 in the coil component 1000B according to a modified example may be covered by an insulating film IF, and the insulating film IF may function to insulate the magnetic material of the body 100 and the coils 210 from each other.

Referring to FIG. 8, a cross-section of the coils 210 perpendicular to a direction in which the coils 210 are wound may have a plurality of round portions disposed on a side facing the core 130.

Figure 9:
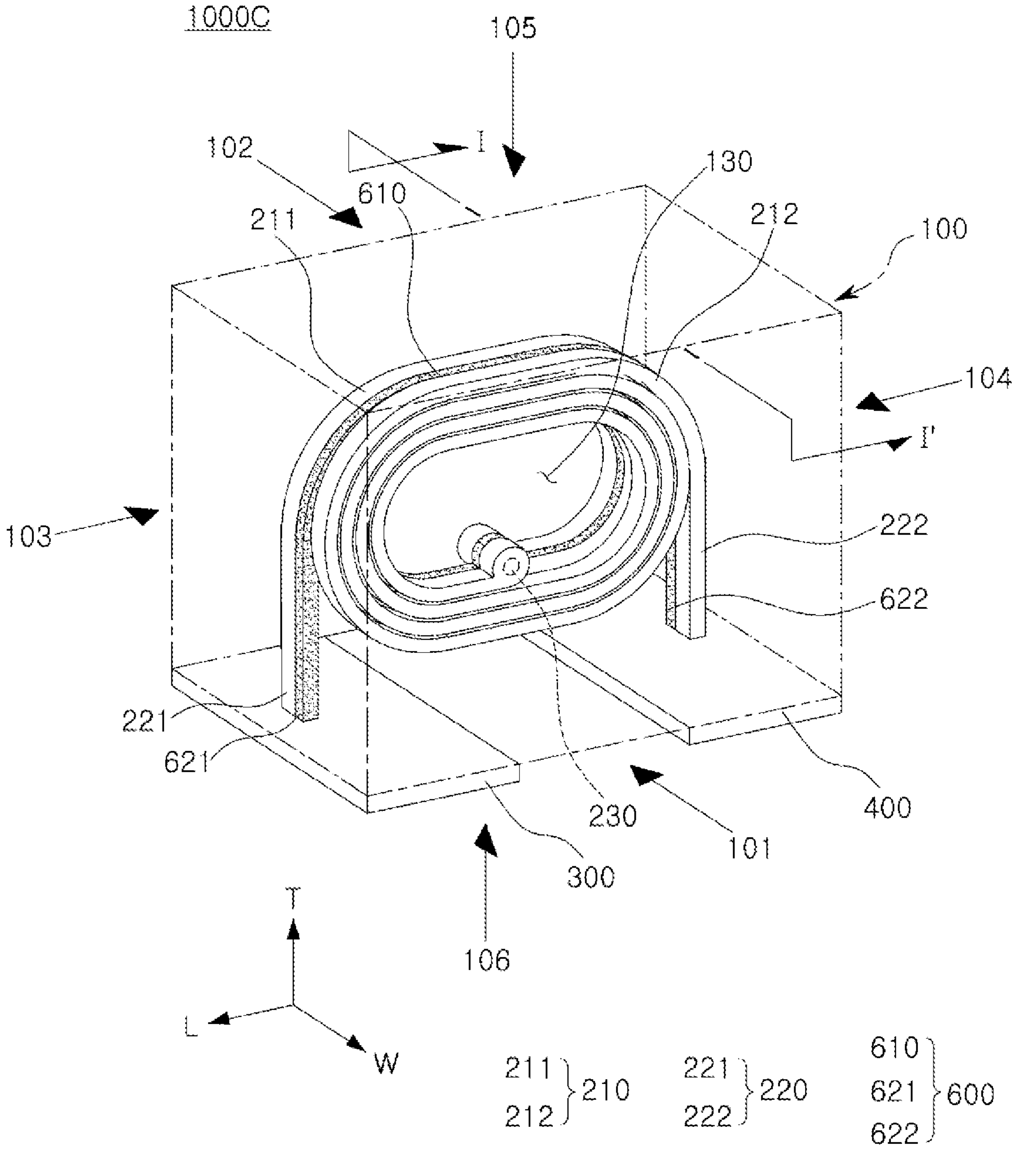
FIG. 9 is a schematic perspective view illustrating another modified example of the coil component of FIG. 1.

FIG. 9 is a schematic perspective view illustrating another modified example of the coil component of FIG. 1.

Figure 10:
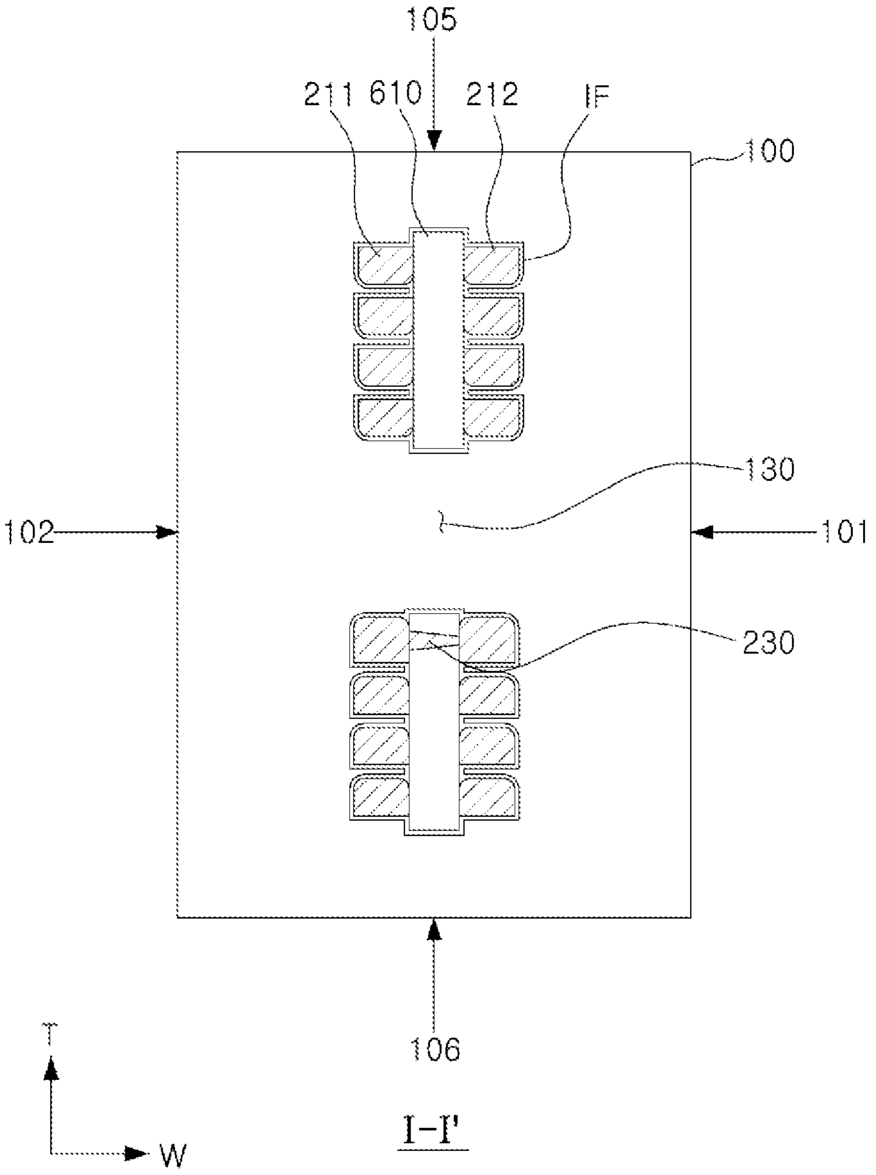
FIG. 10 is a cross-sectional view of the coil component of FIG. 9 taken along line I-I'.

FIG. 10 is a cross-sectional view of the coil component of FIG. 9 taken along line I-I'.

The coil component 1000C according to another modified example of FIG. 9 is different from the coil component 1000A according to an exemplary embodiment of FIG. 1 in the structure of the body 100. Thus, what has been described above for the coil component 1000A according to an exemplary embodiment is identically applicable to the coil component 1000C according to another modified example, except the structure of the body 100.

A core 130 of a body 100 in the coil component 1000C according to another modified example may penetrate through a coil unit 200 and a support substrate 600. That is, the coil unit 200 may be disposed on one surface and the other surface of the support substrate 600 facing each other.

The support substrate 600 may be embedded in the body 100. Specifically, the support substrate 600 may be embedded in the body 100 to be perpendicular to a sixth surface 106 of the body 100. Accordingly, the coil unit 200 disposed on the support substrate 600 may be disposed to be perpendicular to the sixth surface 106 of the body 100.

The support substrate 600 may include a support portion 610 and first and second end portions 621 and 622, and lead-out ends 220 may include first and second lead-out ends. The support portion 610 may support coils 210 (211 and 212) of the coil unit 200, and the first and second end portions 621 and 622 may support the first and second lead-out ends 221 and 222, respectively. The support portion 610 and the first and second end portions 621 and 622 may be integrally connected to each other. That is, no boundaries may be formed between the support portion 610 and the first and second end portions 621 and 622. The first and second end portions 621 and 622 may be exposed to the sixth surface 106 of the body 100 while being spaced apart from each other.

The support substrate 600 may be formed of an insulating material including a thermosetting insulating resin such as an epoxy resin, a thermoplastic insulating resin such as a polyimide resin, or a photosensitive insulating resin, or may be formed of an insulating material including a reinforcing material such as a glass fiber or an inorganic filler together with the aforementioned insulating resin. As an example, the support substrate 600 may be formed of an insulating material such as prepreg, an Ajinomoto build-up film (ABF), FR-4, a bismaleimide triazine (BT) resin, a photo imageable dielectric (PID), or a copper clad laminate (CCL), but is not limited thereto.

As the inorganic filler, at least one selected from the group consisting of silica ($SiO_2$), alumina ($Al_2O_3$), silicon carbide (SiC), barium sulfate ($BaSO_4$), talc, clay, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 600 is formed of an insulating material including a reinforcing material, the support substrate 600 may provide more excellent rigidity. When the support substrate 600 is formed of an insulating material including no glass fiber, it is possible to reduce an overall thickness of the coil unit 200, thereby reducing a width of the coil component 1000C according to the present exemplary embodiment.

The coil unit 200 may be embedded in the body 100 to express the characteristics of the coil component. For example, in a case where the coil component 1000C according to the present exemplary embodiment is used as a power inductor, the coil unit 200 may serve to store an electric field as a magnetic field to maintain an output voltage, thereby stabilizing power of an electronic device.

The coil unit 200 may be disposed on the support substrate 600. The coils 210 of the coil unit 200 may be formed on at least one of one surface and the other surface of the support portion 610 facing each other, and may form at least one turn. In the present exemplary embodiment, the coil unit 200 may include a plurality of coils 211 and 212 facing each other and disposed on both surfaces of the support portion facing each other in the width direction W of the body 100, respectively, and a via 230 penetrating through the support portion 610 to connect respective innermost turns of the plurality of coils 211 and 212 to each other.

The body 100 may include a magnetic material and a resin. As a result, the body 100 may have magnetism. The body 100 may be formed by stacking one or more magnetic composite sheets each including a resin and a magnetic material dispersed in the resin. However, the body 100 may have a structure other than the structure in which the magnetic material is dispersed in the resin. For example, the body 100 may be made of a magnetic material such as ferrite. Concerning the magnetic material, what has been described above for the coil component 1000A according to an exemplary embodiment is identically applicable.

Referring to FIG. 10, surfaces of the first and second coils 211 and 212 in the coil component 1000C according to another modified example may be covered by an insulating film IF, and the insulating film IF may function to insulate the magnetic material of the body 100 and the first and second coils 211 and 212 from each other.

Referring to FIG. 10, a cross-section of each of the first and second coils 211 and 212 perpendicular to a direction in which the first and second coils 211 and 212 are wound may have a plurality of round portions disposed on a side facing the core 130.

Figure 11:
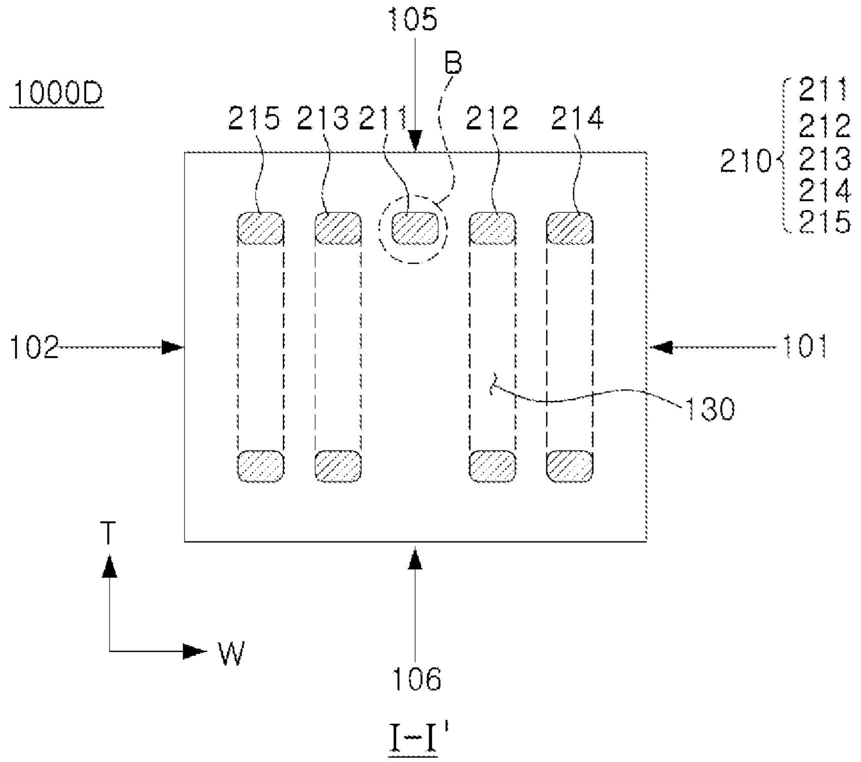
FIG. 11 is a cross-sectional view of a coil component according to another modified example of the coil component of FIG. 1 taken along line I-I'.

FIG. 11 is a cross-sectional view of a coil component according to another modified example of the coil component of FIG. 1 taken along line I-I'.

Figure 12:
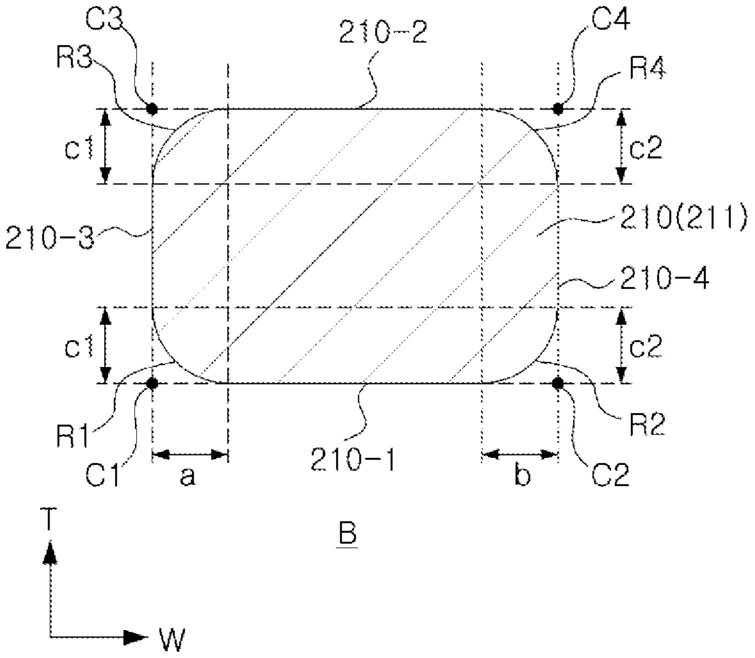
FIG. 12 is a partially enlarged view of region B of FIG. 11.

FIG. 12 is a partially enlarged view of region B of FIG. 11.

The coil component 1000D according to another modified example of FIG. 11 is different from the coil component 1000A according to an exemplary embodiment of the present disclosure in the shape of the cross-section of each coil 210. Thus, in describing the present exemplary embodiment, only the cross-section of the coil 210, which is different from that in an exemplary embodiment, will be described. Concerning the other components in the present exemplary embodiment, what is been described above for the coil component 1000A according to an exemplary embodiment of the present disclosure is identically applicable.

Referring to FIG. 12, the coil component 1000D is different in that round portions may be connected to both ends of a second edge 210-2 facing an outer surface of a body 100 as well as a first edge 210-1 facing a core 130 among edges of the cross-section of the coil 210.

In the coil component 1000A according to an exemplary embodiment, the cross-section of each coil 210 perpendicular to the direction in which the coil 210 is wound has first and second edges 210-1 and 210-2 facing each other, and first and second round portions R1 and R2 are connected to both ends of only the first edge 210-1 facing the core 130. In contrast, the coil component 1000D according to another modified example may have a structure in which third and fourth round portions R3 and R4 are additionally connected to both ends of the second edge 210-2 facing the outer surface of the body 100, not facing the core 130.

The third and fourth round portions R3 and R4 may be formed to face the first and second round portions R1 and R2, respectively, in the third direction T.

Thus, what has been described above for the widths a and c1 of the first round portion R1 is identically applicable to the third round portion R3, and what has been described above for the widths b and c2 of the second round portion R2 is identically applicable to the fourth round portion R4.

Specifically, the width a of the third round portion R3 in the first direction W may refer to a shortest distance from a third intersection point C3 to the second edge 210-2, the third intersection point C3 being a point of intersection between a line extending from the second edge 210-2 in the first direction W and a line extending from the third edge 210-3 in the third direction T.

Also, the width b of the third round portion R3 in the first direction W may refer to a shortest distance from a fourth intersection point C4 to the second edge 210-2, the fourth intersection point C4 being a point of intersection between the line extending from the second edge 210-2 in the first direction W and a line extending from the fourth edge 210-4 in the third direction T.

In addition, the widths c1 and c2 of the third and fourth round portions R3 and R4 in the third direction T perpendicular to the first direction W may refer to shortest distances from the third and fourth intersection points C3 and C4 to the third and fourth edges 210-3 and 210-4, respectively.

Here, c1 and c2 may be substantially equal. In the present disclosure, the term "substantially equal" may mean not only a perfectly equal mathematical value but also a value including an error occurring in a typical manufacturing process.

In the coil component 1000D according to another modified example, since the third and fourth round portions R3 and R4 are additionally formed at both ends of an edge of the cross-section of the coil 210, it is possible to more effectively prevent a current from being concentrated near vertices.

Concerning the other overlapping components, what has been described above for the coil component 1000A according to an exemplary embodiment is identically applicable, and thus, the description thereof will not be repeated.

(Another Exemplary Embodiment)

Figure 13:
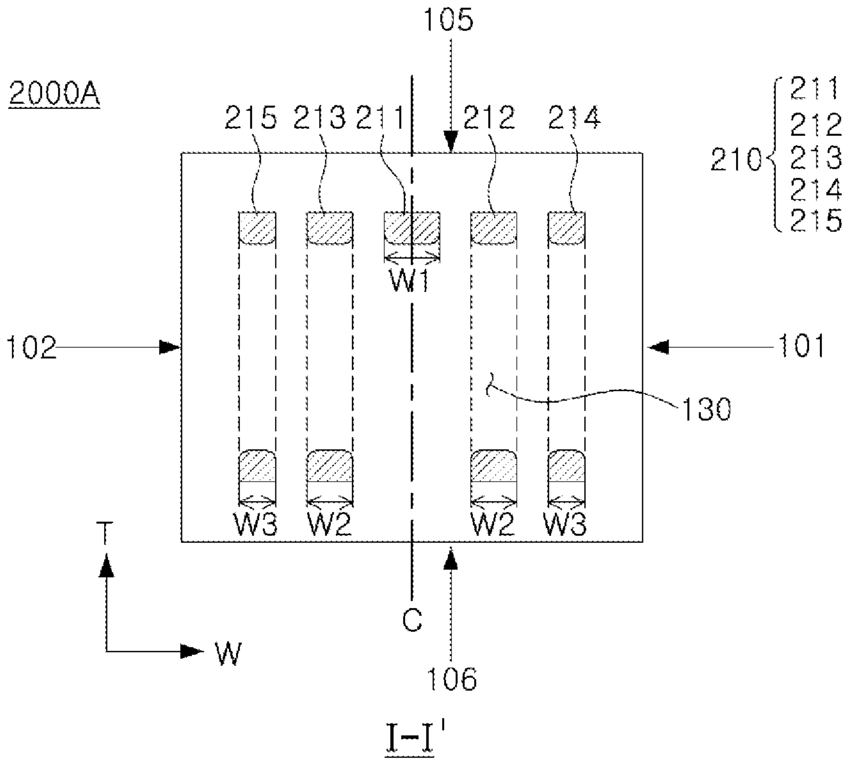
FIG. 13 is a cross-sectional view of a coil component according to another exemplary embodiment taken along line I-I'.

FIG. 13 is a cross-sectional view of a coil component according to another exemplary embodiment taken along line I-I'.

The coil component 2000A of FIG. 13 is different from the coil component 1000A according to an exemplary embodiment of the present disclosure in the widths of the coils 210 in the first direction W. Thus, in describing the present exemplary embodiment, only the widths of the coils 210 in the first direction W, which is different from that in an exemplary embodiment, will be described. Concerning the other components in the present exemplary embodiment, what is been described above for the coil component 1000A according to an exemplary embodiment of the present disclosure is identically applicable.

FIG. 13 illustrates coils 210 disposed on a plurality of effective layers 110. For convenience of explanation, only a body 100 and coils 210 are illustrated in FIGS. 13 through 16.

The coils 210 may be disposed on the plurality of effective layers 110, and may be disposed on five layers as illustrated in FIG. 13. In this case, the coils 210 may include outer coils 214 and 215 disposed on the outermost sides in the first direction W, and inner coils 211, 212, and 213. In this case, widths W1 and W2 of the inner coils 211, 212, and 213 in the first direction W may be larger than a width W3 of the outer coils 214 and 215 in the first direction W. That is, the inner coils 211, 212, and 213 and the outer coils 214 and 215 may have relationships of W1>W3 and W2>W3.

In the present disclosure, each of the widths W1, W2, and W3 of the coils 210 in the first direction may refer to a mean value of shortest distance between third and fourth edges 210-3 and 210-4 of each of the coils 210.

Since the outer coils 214 and 215 are disposed on more outward sides than the inner coils 211, 212, and 213, a current may be further concentrated on the respective outermost sides of the outer coils 214 and 215 due to the parasitic effect and the skin effect described above, as a result causing a difference in effective area in which the current is flowable between the outer coils 214 and 215 and the inner coils 211, 212, and 213. That is, a coil disposed on a more inward side may have a larger Rs value at a high frequency and have a smaller Q characteristic accordingly. Therefore, it is necessary to evenly distribute the current to all the coils 210 by increasing a width of a coil disposed on a more inward side.

In the coil component 2000A according to another exemplary embodiment of FIG. 13, the inner coils 211, 212, and 213 may have a larger width in the first direction W than the outer coils 214 and 215. As a result, the inner coils 211, 212, and 213 may have a larger cross-sectional area in the first and third directions W and T than the outer coils 214 and 215, and the inner coils 211, 212, and 213 may have a larger cross-sectional area in the first and second directions W and L than the outer coils 214 and 215.

Therefore, by increasing the cross-sectional area of the inner coils 211, 212, and 213 as compared with the cross-sectional area of the outer coils 214 and 215, it is possible to mitigate a phenomenon in which the current is further concentrated in the outer coils 214 and 215 than in the inner coils 211, 212, and 213, thereby minimizing a difference in effective area in which the current is flowable between the inner coils 211, 212, and 213 and the outer coils 214 and 215.

In addition, by controlling the widths of the coils in a relative manner in the first direction W, rather than in the second and third directions L and T, it is possible to suppress an influence of the control of the widths on a volume of the core 130, thereby making it possible to sufficiently secure a magnetic flux and an inductance inside the core 130.

In addition, in the coil component 2000A according to another exemplary embodiment of FIG. 13, the inner coils 211, 212, and 213 may also have different widths. That is, among the inner coils 211, 212, and 213, an inner coil disposed farther away from the center C of the body 100 in the first direction W may have a smaller width in the first direction.

That is, among the inner coils 211, 212, and 213, the inner coils 212 and 213 disposed farther away from the center C of the body 100 in the first direction W than the inner coil 211 may have a width W2, and the inner coil 211 disposed closer to the center C of the body 100 in the first direction W than the inner coils 212 and 213 may have a width W1. In this case, the inner coils 211, 212, and 213 may have a relationship of W1>W2.

Consequently, in the coil component 2000A according to another exemplary embodiment of FIG. 13, the widths of the inner and outer coils 211, 212, 213, 214, and 215 may be set to maintain a relationship of W1>W2>W3.

Meanwhile, among the coils 210, coils disposed to face each other at corresponding positions with respect to the center C of the body 100 in the first direction W may have an equal width in the first direction.

As an example, referring to FIG. 13, the outer coils 214 and 215 facing each other and corresponding to each other with respect to the center C of the body 100 in the first direction W may have an equal width as W3. Also, the inner coils 212 and 213 facing each other and corresponding to each other with respect to the center C of the body 100 in the first direction W may have an equal width as W2. Meanwhile, in the present disclosure, the term "equal" may mean an equal design even including a process error, rather than a completely equal numerical value.

Table 3 below compares Q characteristics at a frequency of 2 GHz between coil components 2000A according to another exemplary embodiment of the present disclosure.

TABLE 3

| W3 | W2 | W1 | Ratio of W3:W2:W1 | Q (2 GHz) |
|---|---|---|---|---|
| 10 | 38 | 39 | 1:3.8:3.9 | 46.1 |
| 15 | 35 | 35 | 1:2.3:2.3 | 48.8 |
| 20 | 31.5 | 32 | 1:1.57:1.6 | 48.9 |
| 20 | 30 | 35 | 1:1.5:1.75 | 49.0 |
| 27 | 27 | 27 | 1:1:1 | 47.0 |
| 30 | 25 | 25 | 1:0.83:0.83 | 46.2 |
| 35 | 21.5 | 22 | 1:0.61:0.63 | 41.6 |

Referring to Table 3 above, it can be seen that in the coil component 2000A in the five-layer structure including coils 211, 212, 213, 214, and 215, a Q value is highest when a ratio of W3:W2:W1 is 1:1.5:1.75.

Meanwhile, even when the widths W1 and W2 are excessively larger than the smallest width W3, the Q characteristic may deteriorate.

For example, W1 may be more than 1.4 times W3, and W2 may be less than 2 times W3.

Figure 14:
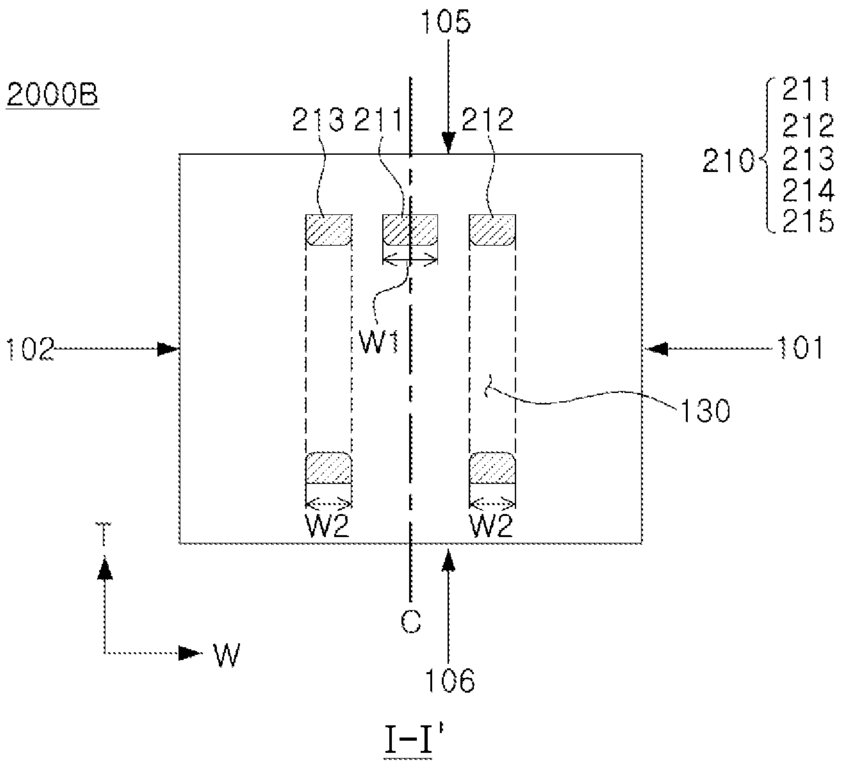
FIG. 14 is a cross-sectional view of a coil component according to a modified example of the coil component of FIG. 13 taken along line I-I'.

FIG. 14 is a cross-sectional view of a coil component according to a modified example of the coil component of FIG. 13 taken along line I-I'.

The coil component 2000B according to a modified example illustrated in FIG. 14 is different from the coil component 2000A of FIG. 13 in the number of coils 210 stacked and the widths of the coils 210 in the first direction W. Thus, in describing the present exemplary embodiment, only the number of coils 210 stacked and the widths of the coils 210 in the first direction W, which are different from those in another exemplary embodiment, will be described. Concerning the other components in the present exemplary embodiment, what is been described above for the coil component 2000A according to another exemplary embodiment of the present disclosure is identically applicable.

Referring to FIG. 14, the coils 210 may include outer coils 212 and 213 disposed on the outermost sides, and an inner coil 211 disposed inward of the outer coils 212 and 213.

In the present exemplary embodiment, W2 may refer to a width of each of the outer coils 212 and 213 in the first direction W, and W1 may refer to a width of the inner coil 211 in the first direction W. W1 may be larger than W2.

In the present disclosure, each of the widths W1 and W2 of the coil s 210 in the first direction may refer to a mean value of shortest distance between third and fourth edges 210-3 and 210-4 of each of the coils 210.

Table 4 below compares Q characteristics at a frequency of 2 GHz between coil components 2000B according to a modified example of the present disclosure.

TABLE 4

| W2 | W1 | Ratio of W2:W1 | Q (2 GHz) |
|---|---|---|---|
| 70 | 10 | 1:0.14 | 36.09 |
| 60 | 30 | 1:0.5 | 50.13 |
| 52 | 46 | 1:0.89 | 55.97 |
| 50 | 50 | 1:1 | 57.31 |
| 44 | 62 | 1:1.41 | 57.49 |
| 42 | 66 | 1:1.5 | 56.28 |
| 40 | 70 | 1:1.75 | 56.59 |
| 30 | 90 | 1:3 | 51.67 |
| 20 | 110 | 1:5.5 | 42.79 |

Referring to Table 3 above, it can be seen that in the coil component 2000B in the three-layer structure including coils 211, 212, and 213, a Q value is highest when a ratio of W2:W1 is 1:1.41.

Meanwhile, even when the width W1 is excessively larger than the smallest width W2, the Q characteristic may deteriorate. For example, W1 may be more than 1.4 times W2 and less than 2 times W2.

Figure 15:
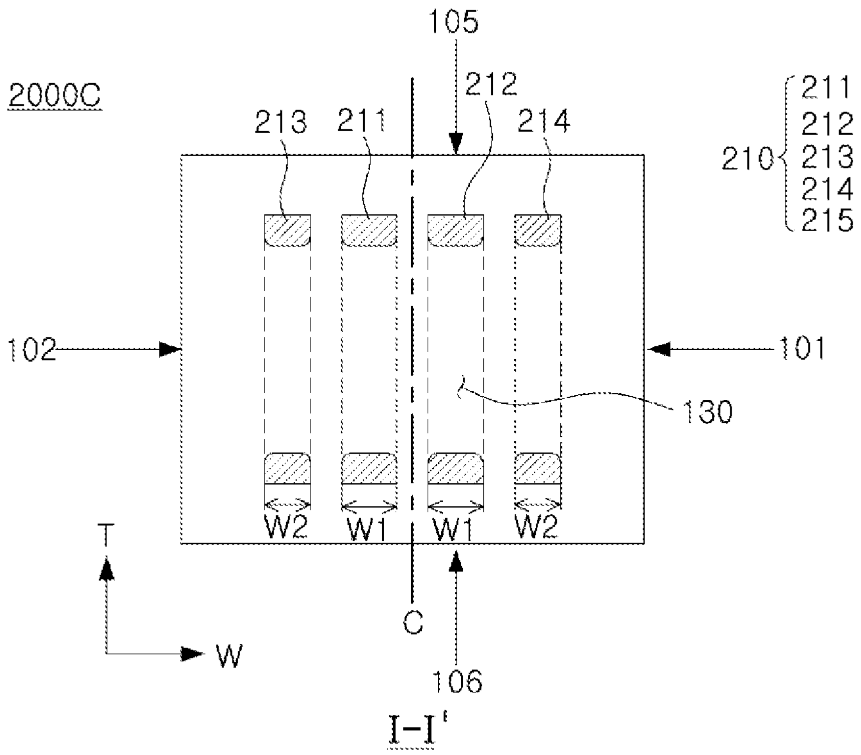
FIG. 15 is a cross-sectional view of a coil component according to another modified example of the coil component of FIG. 13 taken along line I-I'.

FIG. 15 is a cross-sectional view of a coil component according to another modified example of the coil component of FIG. 13 taken along line I-I'.

The coil component 2000C according to another modified example illustrated in FIG. 15 is different from the coil component 2000A of FIG. 13 in the number of coils 210 stacked and the widths of the coils 210 in the first direction W. Thus, in describing the present exemplary embodiment, only the number of coils 210 stacked and the widths of the coils 210 in the first direction W, which are different from those in another exemplary embodiment, will be described. Concerning the other components in the present exemplary embodiment, what is been described above for the coil component 2000A according to another exemplary embodiment of the present disclosure is identically applicable.

Referring to FIG. 15, the coils 210 may include outer coils 213 and 214 disposed on the outermost sides, and inner coils 211 and 212 disposed inward of the outer coils 213 and 214.

In the present exemplary embodiment, W2 may refer to a width of each of the outer coils 213 and 214 in the first direction W, and W1 may refer to a width of each of the inner coils 211 and 212 in the first direction W. W1 may be larger than W2.

In the present disclosure, each of the widths W1 and W2 of the coils 210 in the first direction may refer to a mean value of shortest distance between third and fourth edges 210-3 and 210-4 of each of the coils 210.

Table 5 below compares Q characteristics at a frequency of 2 GHz between coil components 2000C according to another modified example of the present disclosure.

TABLE 5

| W2 | W1 | Ratio of W2:W1 | Q (2 GHz) |
|---|---|---|---|
| 60 | 10 | 1:0.16 | 30.6 |
| 20 | 50 | 1:0.4 | 40.6 |
| 45 | 25 | 1:0.55 | 45.3 |
| 40 | 30 | 1:0.75 | 48.1 |
| 35 | 35 | 1:1 | 50.8 |
| 30 | 40 | 1:1.3 | 51.5 |
| 28 | 42 | 1:1.5 | 52.6 |
| 26 | 44 | 1:1.7 | 51.9 |
| 25 | 45 | 1:1.8 | 52.1 |
| 24 | 46 | 1:1.9 | 51.8 |
| 22 | 48 | 1:2.18 | 50.9 |
| 20 | 50 | 1:2.5 | 50.1 |
| 10 | 60 | 1:6 | 41.4 |

Referring to Table 5 above, it can be seen that in the coil component 2000C in the four-layer structure including coils 211, 212, 213, and 214, a Q value is highest when a ratio of W2:W1 is 1:1.15.

Meanwhile, even when the width W1 is excessively larger than the smallest width W2, the Q characteristic may deteriorate. For example, W1 may be more than 1.4 times W2 and less than 2 times W2.

Figure 16:
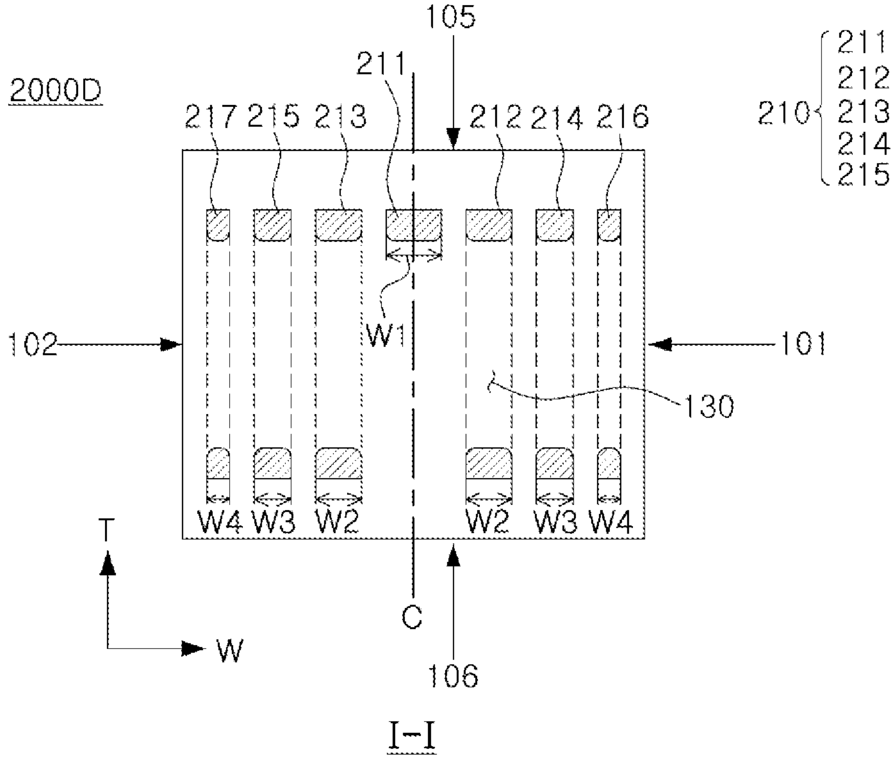
FIG. 16 is a cross-sectional view of a coil component according to another modified example of the coil component of FIG. 13 taken along line I-I'.

FIG. 16 is a cross-sectional view of a coil component according to another modified example of the coil component of FIG. 13 taken along line I-I'.

The coil component 2000D according to another modified example illustrated in FIG. 16 is different from the coil component 2000A of FIG. 13 in the number of coils 210 stacked and the widths of the coils 210 in the first direction W. Thus, in describing the present exemplary embodiment, only the number of coils 210 stacked and the widths of the coils 210 in the first direction W, which are different from those in another exemplary embodiment, will be described. Concerning the other components in the present exemplary embodiment, what is been described above for the coil component 2000A according to another exemplary embodiment of the present disclosure is identically applicable.

Referring to FIG. 16, the coils 210 may include outer coils 216 and 217 disposed on the outermost sides, and inner coils 211, 212, 213, 214, and 215 disposed inward of the outer coils 216 and 217.

In the present exemplary embodiment, W4 may refer to a width of each of the outer coils 216 and 217 in the first direction W, W3 may refer to a width of each of the inner coils 214 and 215 in the first direction W, W2 may refer to a width of each of the inner coils 212 and 213 in the first direction W, and W1 may refer to a width of the inner coil 211 in the first direction W. W1 may be larger than W2, W2 may be larger than W3, and W3 may be larger than W4.

In the present disclosure, each of the widths W1, W2, W3, and W4 of the coils 210 in the first direction may refer to a mean value of shortest distance between third and fourth edges 210-3 and 210-4 of each of the coils 210.

Table 6 below compares Q characteristics at a frequency of 2 GHz between coil components 2000D according to a modified example of the present disclosure.

TABLE 6

| W4 | W3 | W2 | W1 | Ratio of W4:W3:W2:W1 | Q (2 GHz) |
|---|---|---|---|---|---|
| 8 | 20.6 | 20.6 | 20.6 | 1/2.6/2.6/2.6 | 41.6 |
| 12 | 19 | 19 | 19 | 1/1.58/1.58/1.58 | 42.2 |
| 17 | 17 | 17 | 17 | 1/1/1/1 | 40.9 |
| 12 | 17 | 20.3 | 20.3 | 1/1.42/1.69/1.69 | 42.6 |
| 12. | 18 | 19.6 | 19.6 | 1/1.5/1.63/1.63 | 42.7 |
| 12 | 18 | 18 | 23 | 1/1.5/1.5/1.92 | 42.0 |
| 12 | 18 | 18.4 | 22.2 | 1/1.5/1.53/1.85 | 43.2 |
| 12 | 18 | 18.8 | 21.4 | 1/1.5/1.56/1.78 | 42.4 |
| 20 | 15.8 | 15.8 | 15.8 | 1/0.79/0.79/0.79 | 40.4 |

Referring to Table 6 above, it can be seen that in the coil component 2000D in the seven-layer structure including coils 211, 212, 213, 214, 215, 216, and 217, a Q value is highest when a ratio of W4:W3:W2:W1 is 1:1.5:1.53:1.85.

Meanwhile, even when each of the widths W1, W2, and W3 is excessively larger than the smallest width W4, the Q characteristic may deteriorate. For example, each of W1, W2, and W3 may be more than 1.4 times W4 and less than 2 times W4.

As set forth above, according to the exemplary embodiments in the present disclosure, it is possible to minimize a decrease in inductance (Ls) of the coil component while reducing a DC resistance (Rdc) of the coil component.

While exemplary embodiments have been shown and described above, it will be apparent to those skilled in the art that modifications and variations could be made without departing from the scope of the present invention as defined by the appended claims.

What is claimed is:

1. A coil component comprising:

a body;

a coil unit including lead-out ends and a plurality of separate coils, and embedded in the body; and a core penetrating through the coil unit in a first direction, wherein a cross-section of each of the coils perpendicular to a second direction or a third direction has a plurality of corners, where inner corners, disposed on a side facing the core, include first and second round portions, the second and third directions intersecting each other and orthogonal to the first direction, and wherein the first and second round portions of the inner corners are more rounded than outer corners, disposed on a side facing away from the core, among the plurality of corners.

2. The coil component of claim 1, wherein the cross-section of each of the coils perpendicular to the second direction or the third direction has a plurality of edges, and the first and second round portions are spaced apart from each other and connected to both ends, respectively, of an edge facing the core among the plurality of edges.

3. The coil component of claim 2, wherein the lead-out ends extend out of the body from the coils, a cross-section of each of the lead-out ends perpendicular to a direction in which the lead-out ends extend has a plurality of edges, and a plurality of round portions spaced apart from each other and connected to both ends, respectively, of at least one of the plurality of edges.

4. The coil component of claim 2, further comprising third and fourth round portions spaced apart from each other and connected to both ends, respectively, of an edge facing an outer surface of the body, opposing the edge facing the core, among the plurality of edges.

5. The coil component of claim 2, further comprising first and second external electrodes spaced apart from each other on one surface of the body, wherein the lead-out ends extend to the one surface of the body to be connected to the first and second external electrodes, respectively.

6. The coil component of claim 2, wherein a ratio of a to b (a/b) satisfies $0.8<a/b<1.2$, where a is a width of the first round portion in the first direction, and b is a width of the second round portion in the first direction.

7. The coil component of claim 2, wherein a ratio of a to c1 (a/c1) satisfies $0.8<a/c1<1.2$, where a is a width of the first round portion in the first direction, and c1 is a width of the first round portion in a second direction perpendicular to the first direction.

8. The coil component of claim 2, wherein a ratio of b to c2 (b/c2) satisfies $0.8<b/c2<1.2$, where b is a width of the second round portion in the first direction, and c2 is a width of the second round portion in a second direction perpendicular to the first direction.

9. The coil component of claim 5, further comprising a plurality of effective layers stacked in the first direction, wherein the coils are disposed in the plurality of effective layers, respectively.

10. The coil component of claim 5, further comprising:

a mold portion embedded in the body;

a cover portion disposed on one surface of the mold portion; and a core portion protruding from the one surface of the mold portion, wherein the coils are disposed between the one surface of the mold portion and the cover portion, and the core portion is disposed in the core to penetrate through the coils.

11. The coil component of claim 5, further comprising:

a support substrate embedded in the body; and a via penetrating through at least a portion of the support substrate, wherein the core penetrates through the support substrate in the first direction, and the coils are disposed on a first surface and a second surface of the support substrate, respectively, and electrically connected to each other through the via.

12. The coil component of claim 2, wherein the coils include outer coils disposed to face each other on outermost sides in the first direction, and inner coils disposed inward of the outer coils, and when a width of each of the inner coils in the first direction is defined as W1, and a width of each of the outer coils in the first direction is defined as W2, W1 is larger than W2.

13. The coil component of claim 12, wherein each of the inner coils has a smaller W1 value as being farther away from the center of the body in the first direction.

14. The coil component of claim 12, wherein among the coils, coils disposed to oppose each other at corresponding positions with respect to the center of the body in the first direction have an equal width in the first direction.

15. The coil component of claim 12, wherein a ratio of W1 to W2 (W1/W2) satisfies $1.4<W1/W2<2$.

16. The coil component of claim 1, wherein among side surfaces of each coil, a side surface, facing the core and extending along a direction in which each coil is wound, has a curved surface.

17. The coil component of claim 1, wherein the first and second round portions are connected to each other.

18. A coil component comprising:

a body;

a coil unit including lead-out ends and a plurality of separate coils, and embedded in the body; and a core penetrating through the coil unit in a first direction, wherein, when a direction perpendicular to the first direction is defined as a second direction, and a direction perpendicular to both the first and second directions is defined as a third direction, at least one of a cross-section of each of the coils in the first and second directions or a cross-section of each of the coils in the first and third directions has a plurality of corners, where inner corners, disposed on a side facing the core, include a plurality of round portions, and wherein the plurality of round portions of the inner corners are more rounded than outer corners, disposed on a side facing away from the core, among the plurality of corners.

19. The coil component of claim 18, wherein at least one of the cross-section of the coil in the first and second directions and the cross-section of the coil in the first and third directions has a plurality of edges, each connecting adjacent corners of the plurality of corners, and the plurality of round portions are spaced apart from each other and connected to both ends, respectively, of an edge facing the core among the plurality of edges.

20. The coil component of claim 18, wherein the coils include outer coils disposed on outermost sides in the first direction, and inner coils disposed inward of the outer coils, and when a width of each of the inner coils in the first direction is defined as W1, and a width of each of the outer coils in the first direction is defined as W2, W1 is larger than W2.

21. A coil component comprising:

a body;

a coil unit including lead-out ends and a plurality of separate coils, and embedded in the body; and a core penetrating through the coil unit in a first direction, wherein, in a cross-section of each of the coils perpendicular to a second direction or a third direction, the second and third directions intersecting each other and orthogonal to the first direction, a first average width of an inner region, facing the core, is smaller than a second average width of an outer region, facing away from the core, wherein each of the first and second widths is defined in the first direction, wherein the cross-section of each of the coils has a plurality of corners, and wherein inner corners, which are closest to the core, are more rounded than outer corners, which are farthest from the core, among the plurality of corners.

22. The coil component of claim 21, wherein each of two closest corners to the core among the plurality of corners includes a round portion.

23. The coil component of claim 22, wherein, when the two closest corners are defined as first and second round portions, respectively, a ratio of a to b (a/b) satisfies $0.8<a/b<1.2$, where a is a width of the first round portion in the first direction, and b is a width of the second round portion in the first direction.

24. The coil component of claim 22, wherein, when the two closest corners are defined as first and second round portions, respectively, a ratio of a to c1 (a/c1) satisfies $0.8<a/c1<1.2$, where a is a width of the first round portion in the first direction, and c1 is a width of the first round portion in a second direction perpendicular to the first direction.

25. The coil component of claim 22, wherein, when the two closest corners are defined as first and second round portions, respectively, a ratio of b to c2 (b/c2) satisfies $0.8<b/c2<1.2$, where b is a width of the second round portion in the first direction, and c2 is a width of the second round portion in a second direction perpendicular to the first direction.

* * * * *